(12) United States Patent  
Komma et al.

(10) Patent No.: US 8,130,603 B2  
(45) Date of Patent: Mar. 6, 2012

(54) OPTICAL DISK DRIVING APPARATUS, OPTICAL DISK DRIVING SYSTEM, VEHICLE EQUIPPED WITH OPTICAL DISK DRIVING SYSTEM, METHOD OF CORRECTING SPHERICAL ABERRATION IN OPTICAL DISK DRIVING APPARATUS, PROGRAM AND RECORDING MEDIUM

(75) Inventors: Yoshiaki Komma, Osaka (JP); Fumitomo Yamasaki, Nara (JP); Toshiyasu Tanaka, Osaka (JP); Kanji Wakabayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 12/356,212

(22) Filed: Jan. 20, 2009

(65) Prior Publication Data

US 2010/0074067 A1 Mar. 25, 2010

(30) Foreign Application Priority Data

Jan. 22, 2008 (JP) ................................. 2008-011260

(51) Int. Cl.  
*G11B 7/00* (2006.01)

(52) U.S. Cl. ................. 369/44.32; 369/44.29; 369/44.14

(58) Field of Classification Search ................ 369/44.32  
See application file for complete search history.

(56) References Cited

U.S. PATENT DOCUMENTS

| | | | | |
|---|---|---|---|---|
| 7,068,445 B2 * | 6/2006 | Hayashi et al. | ................ | 359/719 |
| 7,245,565 B2 * | 7/2007 | Yamasaki et al. | ........... | 369/44.32 |
| 7,307,927 B2 * | 12/2007 | Fujita et al. | ................ | 369/44.29 |
| 7,339,859 B2 * | 3/2008 | Nagatsuka | ................. | 369/44.14 |
| 7,342,869 B2 * | 3/2008 | Mizuno | ..................... | 369/112.24 |
| 2004/0027938 A1 | 2/2004 | Sasaki et al. | | |
| 2006/0104183 A1 * | 5/2006 | Kataoka et al. | .......... | 369/112.01 |
| 2010/0074067 A1 * | 3/2010 | Komma et al. | ............ | 369/44.32 |

FOREIGN PATENT DOCUMENTS

JP 2004-62938 A 2/2004  
JP 2007-328886 A 12/2007

* cited by examiner

*Primary Examiner* — Van Chow  
(74) *Attorney, Agent, or Firm* — RatnerPrestia

(57) ABSTRACT

An optical disk driving apparatus includes an optical head device having a laser light source, a converging optical system converging a light beam emitted by the laser light source onto an optical disk, a photo detector receiving reflected light reflected by the optical disk, and an aberration correcting optical system controlling aberration of the converging optical system; a motor rotating the optical disk; and a control section receiving a signal from the photo detector, wherein the converging optical system has an objective lens formed using resin as a main material, the aberration correcting optical system has a spherical aberration correcting element correcting spherical aberration, and the control section evaluates quality of a reproduction signal for information in the optical disk by using the reflected light received by the photo detector, and utilizes a result of the evaluation to perform closed loop control on the spherical aberration correcting element.

2 Claims, 15 Drawing Sheets ced by the optical disk 9 caused by a change in temperature, a change in the temperature of an optical pickup device or an optical element is measured by a temperature sensor 53 to allow the collimate lens 205 to be traveled in the direction of an optical axis.

OPTICAL DISK DRIVING APPARATUS, OPTICAL DISK DRIVING SYSTEM, VEHICLE EQUIPPED WITH OPTICAL DISK DRIVING SYSTEM, METHOD OF CORRECTING SPHERICAL ABERRATION IN OPTICAL DISK DRIVING APPARATUS, PROGRAM AND RECORDING MEDIUM

BACKGROUND OF THE INVENTION

1. Field of the Invention

The present invention relates to an optical disk driving apparatus that records, reproduces, and erases information stored on an optical information medium, for example, an optical disk or an optical card, an optical disk system, a vehicle equipped with the optical disk system, a method of correcting spherical aberration in the optical disk driving apparatus, a program, and a recording medium.

2. Related Art of the Invention

Optical memory techniques using an optical disk with a bit-like pattern as a high-density, high-capacity storage medium have been expanding in application and put to practical use for digital audio disks, video disks, text file disks, and data files. Functions of utilizing a fine focused light beam to reliably and accurately record and reproduce information on and from the optical disk are roughly classified into a light converging function, focus control and tracking control provided by an optical system, and pit signal (information reproduction signal) detection.

In recent years, to further increase the recording density of the optical disk, efforts have been made to increase the numerical aperture (NA) of an objective lens that focuses the light beam on the optical disk to form a fine spot corresponding to a diffraction limit.

Furthermore, to reduce costs of the optical disk system, attempts have been made to form the objective lens using resin.

A major disadvantage of a resin objective lens with a high NA is that the refractive index of the lens varies with temperature. Variation in refractive index means a deviation in the refractive power of a lens surface from a design value. This may cause spherical aberration. Aberration of a lower order more significantly degrades the quality of information reproduction signals. Third-order spherical aberration is particularly disadvantageous. Thus, efforts have been made to provide an optical disk driving apparatus using the resin objective lens with the high NA. By way of example, FIG. 15 shows contents disclosed in Japanese Patent Laid-Open No. 2007-328886.

In an optical head device shown in FIG. 15, divergent light emitted by a blue light optical system 51 with a blue light source passes through a beam splitter 161 and is changed to parallel light by a collimate lens 205. The light is then converged, by an objective lens 50, on an information recording surface of an optical disk 9 (third generation optical disk) with a base material thickness of 0.1 mm. The light reflected by the optical disk 9 follows the opposite path and is then detected by a detector in the blue light optical system 51.

Divergent light emitted by a red light optical system 52 with a red light source is changed to parallel light by the collimate lens 205. The light is then converged, by the objective lens 50, on an information recording surface of an optical disk 10 (second generation optical disk) with a base material thickness of 0.6 mm. The light reflected by the optical disk 10 follows the opposite path and is then detected by a detector in the red light optical system 52.

A configuration with an infrared light source is also disclosed by Japanese Patent Laid-Open No. 2007-328886.

To correct a change in spherical aberration in blue light on the optical disk 9 caused by a change in temperature, a change in the temperature of an optical pickup device or an optical element is measured by a temperature sensor 53 to allow the collimate lens 205 to be traveled in the direction of an optical axis.

In this configuration, the distance by which the collimate lens travels is determined based only on the temperature obtained from the temperature sensor. This is what is called open loop control. However, the thus determined travel distance of the collimate lens may involve an error. Major error factors include the accuracy of the temperature sensor (an error of several degrees), variation, among individual light sources, in the amount by which wavelength changes depending on temperature, and a deviation of the dependence of the wavelength change on temperature from linearity. Here, the deviation from the linearity corresponds to a deviation from a proportional relationship between the wavelength change amount and the temperature change amount. The deviation from the linearity is caused by mode hopping or the like.

A deviation of the third-order spherical aberration in the resin objective lens caused by the temperature change is about 1 m$\lambda$rms per degree centigrade when the numerical aperture of the objective lens is 0.6.

On the other hand, when the numerical aperture of the spherical lens up to 0.85, the deviation of the third-order spherical aberration in the resin objective lens caused by the temperature change increases up to 3 m$\lambda$rms to 10 m$\lambda$rms, though the deviation also depends on a focal distance. Thus, on the assumption that an error in the temperature sensor is 2° C., an error in spherical aberration may be at least 6 m$\lambda$rms. For proper signal reproduction, the error in spherical aberration is desirably kept equal to or less than 10 m$\lambda$rms. Thus, an error of at least 6 m$\lambda$rms caused by the single factor, that is, the temperature change, is intolerable. Furthermore, if the deviation of the third-order spherical aberration per degree centigrade exceeds 3 m$\lambda$rms, the error further increases and is more intolerable. Thus, the above-described method of correcting the third-order spherical aberration is insufficient, in which the travel distance of the collimate lens is determined based only on the open loop control using the temperature obtained from the temperature sensor.

In view of the problems with the conventional method of correcting spherical aberration, an object of the present invention is to provide an optical disk driving apparatus that enables information signals to be properly reproduced in spite of the use of an objective lens mainly composed of resin, as well as a related optical disk system, a vehicle utilizing the optical disk system, a method of correcting spherical aberration in the optical disk driving apparatus, a program, and a recording medium.

SUMMARY OF THE INVENTION

The $1^{st}$ aspect of the present invention is an optical disk driving apparatus comprising:

an optical head device having a laser light source, a converging optical system converging a light beam emitted by the laser light source onto an optical disk, a photo detector receiving reflected light reflected by the optical disk, and an aberration correcting optical system controlling aberration of the converging optical system;

a motor rotating the optical disk; and a control section receiving a signal from the photo detector, wherein the converging optical system has an objective lens formed using resin as a main material, the aberration correcting optical system has a spherical aberration correcting element correcting spherical aberration of the objective lens, and the control section evaluates quality of a reproduction signal for information in the optical disk by using the reflected light received by the photo detector, and utilizes a result of the evaluation to perform closed loop control on the spherical aberration correcting element.

The $2^{nd}$ aspect of the present invention is the optical disk driving apparatus according to the $1^{st}$ aspect of the present invention, wherein the aberration correcting optical system has a driving section driving the spherical aberration correcting element, and the control section performs the closed loop control by allowing the driving section to move a position of the spherical aberration correcting element.

The $3^{rd}$ aspect of the present invention is the optical disk driving apparatus according to the $2^{nd}$ aspect of the present invention, wherein the control section starts the closed loop control (1) at intervals of a predetermined period, (2) when an index indicating the quality of the reproduction signal fails to meet a predetermined condition, (3) when a travel distance of the objective lens in a radial direction reaches at least a given level, or (4) when temperature or a temperature difference meets a predetermined condition.

The $4^{th}$ aspect of the present invention is the optical disk driving apparatus according to the $3^{rd}$ aspect of the present invention, wherein after the closed loop control is performed and before next closed loop control is started, the control section performs open loop control by moving the position of the spherical aberration correcting element according to the temperature or the temperature difference.

The $5^{th}$ aspect of the present invention is the optical disk driving apparatus according to the $4^{th}$ aspect of the present invention, wherein the open loop control performed according to the temperature difference means that the open loop control is performed according to the temperature difference when a difference in ambient temperature of the objective lens between different points in time is larger than a predetermined threshold value.

The $6^{th}$ aspect of the present invention is the optical disk driving apparatus according to the $4^{th}$ aspect of the present invention, wherein when the control section starts the closed loop control at intervals of the predetermined period, the control section starts the open loop control at intervals of a period shorter than the predetermined period.

The $7^{th}$ aspect of the present invention is the optical disk driving apparatus according to the $4^{th}$ aspect of the present invention, wherein when the control section starts the closed loop control when the temperature or the temperature difference meets the predetermined condition, the control section starts the closed loop control when the temperature or the temperature difference is greater than a predetermined reference value, and starts the open loop control when the temperature or the temperature difference is smaller than the predetermined reference value.

The $8^{th}$ aspect of the present invention is the optical disk driving apparatus according to the $1^{st}$ aspect of the present invention, wherein the control section forcibly performs the closed loop control after power-on, then performs the open loop control on the spherical aberration correcting element for a given period based on temperature or a temperature difference, and after the given period, performs the closed loop control.

The $9^{th}$ aspect of the present invention is the optical disk driving apparatus according to the $1^{st}$ aspect of the present invention, wherein the control section performs, for a given period after power-on, the open loop control on the spherical aberration correcting element based on temperature or a temperature difference, and after the given period, performs the closed loop control.

The $10^{th}$ aspect of the present invention is the optical disk driving apparatus according to the $4^{th}$ aspect of the present invention, the $8^{th}$ aspect of the present invention, or the $9^{th}$ aspect of the present invention, wherein the optical head device has a temperature sensor sensing the temperature, and the temperature or the temperature difference is obtained from a sensing result from the temperature sensor.

The $11^{th}$ aspect of the present invention is the optical disk driving apparatus according to the $4^{th}$ aspect of the present invention, the $8^{th}$ aspect of the present invention, or the $9^{th}$ aspect of the present invention, wherein the optical head device has an actuator fine-tuning a position of the objective lens, and the temperature difference is obtained from amount of a change in current flowing through the actuator.

The $12^{th}$ aspect of the present invention is the optical disk driving apparatus according to the $4^{th}$ aspect of the present invention, the $8^{th}$ aspect of the present invention, or the $9^{th}$ aspect of the present invention, wherein the optical head device has a temperature sensor located around a periphery of the laser light source to sense the temperature, and an actuator fine-tuning the position of the objective lens, and the open loop control is performed by utilizing a temperature difference obtained from the sensing result from the temperature sensor and a temperature difference obtained from the amount of the change in the current flowing through the actuator.

The $13^{th}$ aspect of the present invention is the optical disk driving apparatus according to the $2^{nd}$ aspect of the present invention, wherein when the control section performs the closed loop control, upon moving the position of the spherical aberration correcting element to change a spherical aberration correction amount, the control section (1) further changes the spherical aberration correction amount in the same direction as that of the change when the index for the quality of the reproduction signal indicates improved quality, and (2) changes the spherical aberration correction amount in a direction opposite to that of the change when the index for the quality of the reproduction signal indicates degraded quality.

The $14^{th}$ aspect of the present invention is the optical disk driving apparatus according to the $13^{th}$ aspect of the present invention, wherein when a change in the index for the quality of the reproduction signal is within a given range in spite of the change in the spherical aberration correction amount, the closed loop control is terminated.

The $15^{th}$ aspect of the present invention is the optical disk driving apparatus according to the $1^{st}$ aspect of the present invention, wherein when the control section performs the closed loop control, the control section evaluates the quality of the reproduction signal by changing at least one of offset amount of a focus control signal, a waveform equalization coefficient for the reproduction signal, and inclination of the objective lens, in addition to moving the position of the spherical aberration correcting element to change the spherical aberration correction amount.

The 16th aspect of the present invention is the optical disk driving apparatus according to the 1st aspect of the present invention, wherein the control section evaluates a jitter value, amount of deviation between a PPML estimated value and the reproduction signal, or an error rate, as the quality of the reproduction signal.

The 17th aspect of the present invention is the optical disk driving apparatus according to the 1st aspect of the present invention, wherein for the resin that is the main material of the objective lens, a change rate of a refractive index with respect to a change in temperature ranges from $-1.5 \times 10E-4$ per degree centigrade to $-0.8 \times 10E-4$ per degree centigrade.

The 18th aspect of the present invention is an optical disk system comprising:

the optical disk driving apparatus according to any of the 1st aspect of the present invention to the 9th aspect of the present invention;

an input device or an input terminal via which information is input;

a calculation device performing a calculation based on information input by the input device or information reproduced by the optical disk driving apparatus; and an output terminal via which the information input by the input device, the information reproduced by the optical disk driving apparatus, or a result of the calculation performed by the calculation device is displayed or output.

The 19th aspect of the present invention is an optical disk system comprising:

the optical disk driving apparatus according to any of the 1st aspect of the present invention to the 9th aspect of the present invention; and an information-to-image converting device converting information signal obtained from the optical disk driving apparatus into an image.

The 20th aspect of the present invention is an optical disk system comprising:

the optical disk driving apparatus according to any of the 1st aspect of the present invention to the 9th aspect of the present invention; and an image-to-information converting device converting image information into information recorded by the optical disk driving apparatus.

The 21st aspect of the present invention is an optical disk system comprising:

the optical disk driving apparatus according to any of the 1st aspect of the present invention to the 9th aspect of the present invention;

a radio input/output terminal via which information from an external device is input and information is output to the external device; and an optical disk changer allowing a plurality of optical disks to be placed in and removed from the optical disk driving apparatus.

The 22nd aspect of the present invention is a vehicle comprising:

the optical disk driving apparatus according to any of the 1st aspect of the present invention to the 9th aspect of the present invention;

a body equipped with the optical disk driving apparatus;

a power generating device generating power required to move the body; and an output device outputting information on movement of the body based on information from the optical disk driving apparatus.

The 23rd aspect of the present invention is a method of correcting spherical aberration in an optical disk driving apparatus, said optical disk driving apparatus comprising:

an optical head device having a laser light source, a converging optical system including an objective lens converging a light beam emitted by the laser light source onto an optical disk, the objective lens being formed using resin as a main material, a photo detector receiving reflected light reflected by the optical disk, and a spherical aberration correcting element correcting spherical aberration of the objective lens;

a motor rotating the optical disk; and a control section receiving a signal from the photo detector, wherein the method comprises:

a control step of allowing the control section to evaluate quality of a reproduction signal for information in the optical disk by using the reflected light and to utilize a result of the evaluation to perform closed loop control on the spherical aberration correcting element.

The 24th aspect of the present invention is the method of correcting spherical aberration in the optical disk driving apparatus according to the 23rd aspect of the present invention, wherein the closed loop control is performed by moving a position of the spherical aberration correcting element in the control step.

The 25th aspect of the present invention is a program causing a computer contained in a control circuit to function, as the control section evaluating quality of a reproduction signal for information in the optical disk by using the reflected light received by the photo detector of the optical disk driving apparatus according to the 1st aspect of the present invention and utilizing the result of the evaluation to perform closed loop control on the spherical aberration correcting element.

The 26th aspect of the present invention is a program causing a computer contained in a control circuit to execute the control step of the method of correcting spherical aberration in the optical disk driving apparatus according to the 23rd aspect of the present invention, the control step allowing the control section to evaluate quality of a reproduction signal for information in the optical disk by using the reflected light and to utilize a result of the evaluation to perform closed loop control on the spherical aberration correcting element.

The 27th aspect of the present invention is a recording medium in which the program according to the 25th aspect of the present invention or the 26th aspect of the present invention is recorded, wherein the recording medium can be processed by the computer contained in the control circuit.

An invention relating to the present invention is an electric circuit to be mounted in an optical disk driving apparatus, the optical disk driving apparatus comprising:

an optical head device having a laser light source, a converging optical system converging a light beam emitted by the laser light source to a fine spot on an optical disk, a photo detector receiving reflected light reflected by the optical disk to output an electric signal corresponding to a light quantity, and an aberration correcting optical system controlling aberration of the converging optical system; and a motor rotating the optical disk, the converging optical system comprising an objective lens, the objective lens being formed using resin as a main material, and the aberration correcting optical system comprising a spherical aberration correcting element, wherein the electric circuit stores a method of correcting spherical aberration in the optical disk driving apparatus, the method being characterized in that spherical aberration correction amount search is appropriately performed by varying amount of spherical aberration correction performed by the spherical aberration correcting element.

In spite of the use of the objective lens formed using resin as a main material, the configuration of the present invention can provide an optical disk driving apparatus that enables an information signal to be properly reproduced, and a related optical disk system, a vehicle equipped with the optical disk system, a method of correcting spherical aberration in the optical disk driving apparatus, a program, and a recording medium.

DESCRIPTION OF SYMBOLS

Figure 1:
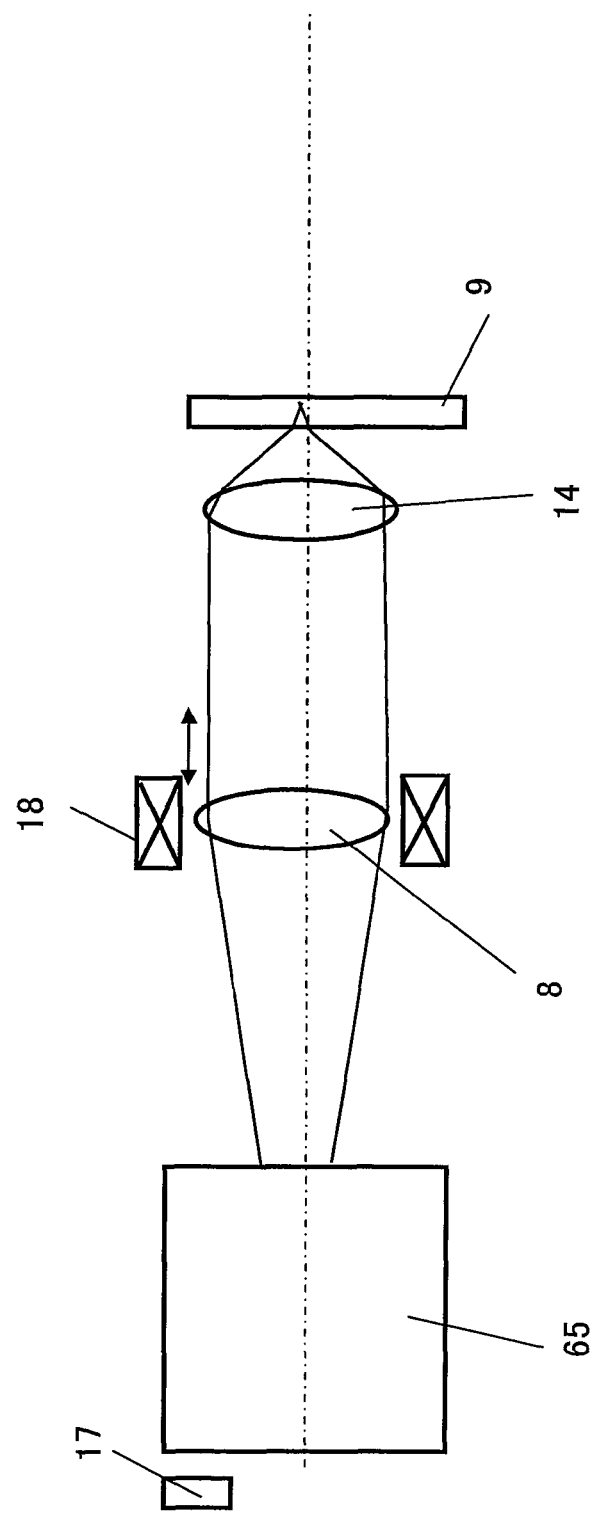
FIG. 1 is a diagram illustrating an optical head device according to Embodiment 1 of the present invention.

1 Laser light source (blue laser)
3, 22 3 beam grating
4, 16 Beam splitter
5 Quarter wavelength plate
6 Converging lens
7 Photo detector
8 Collimate lens
9, 10, 11 Optical disk
14 Objective lens
15 Objective lens driving means
18 Driving means
20 Laser light source (2 wavelength laser light source for red light and infrared light)
32 Detection lens
33 Photo detector
65 Blue light optical system
131 Diffraction element
151 Optical head device driving device
153 Electric circuit
155 Optical head device
167 Optical disk driving apparatus
181 Output device
300 Computer (personal computer)
310 Optical disk recorder
330 Optical disk server
364 Calculation device
365 Input device (keyboard)
366 Decoder
368 Encoder
369 Input/output terminal
377 Optical disk player (or car navigation system)

PREFERRED EMBODIMENT OF THE INVENTION

Embodiments of the present invention will be described with reference to the drawings.

Embodiment 1

FIG. 1 is a schematic diagram illustrating an embodiment of an optical head device used in an optical disk driving apparatus according to the present invention.

As shown in FIG. 1, divergent light emitted by a blue light optical system 65 with a blue light source is changed to substantially parallel light by a collimate lens 8. The light is then converged, by an objective lens 14 made of resin, on an information recording surface of an optical disk 9 (third generation optical disk) with a base material thickness of 0.1 mm. The light reflected by the optical disk 9 follows the opposite path and is then detected by a detector included in the blue light optical system 65.

The resin making up the objective lens 14 needs to offer a transmittance and a refractive index unlikely to be changed even when the objective lens 14 is irradiated with blue light for a long time. In view of this, by way of example, a polyolefin-containing resin is desirable. The change rate of the refractive index of the resin, the main material of the objective lens, with respect to temperature change is about 10 times as high as that of glass and is within the range from $-1.5\times10E-4$ to $-0.8\times10E-4$ per degree centigrade. Here, x denotes multiplication. Furthermore, $10E-4$ indicates the minus fourth power of 10.

To correct a change in the spherical aberration of blue light on the optical disk 9 caused by a change in temperature, an error in the thickness of a base material, or the like, the collimate lens 8 is moved in the direction of an optical axis by driving means 18. The driving means 18 desirably uniquely determines a driving amount from a driving signal provided to the driving means. In view of this, a pulse motor is desirably used. Using the pulse motor as the driving means 18 is effective for allowing spherical aberration learning described below to be performed using a reduced number of components without the need for a position sensor. Alternatively, to allow the device to be miniaturized, a piezo element can be effectively used. In this case, the position of the collimate lens 8 cannot be uniquely determined based only on an electric driving signal. Thus, a position sensor (not shown in the drawings) for the collimate lens 8 is desirably provided.

Figure 2:
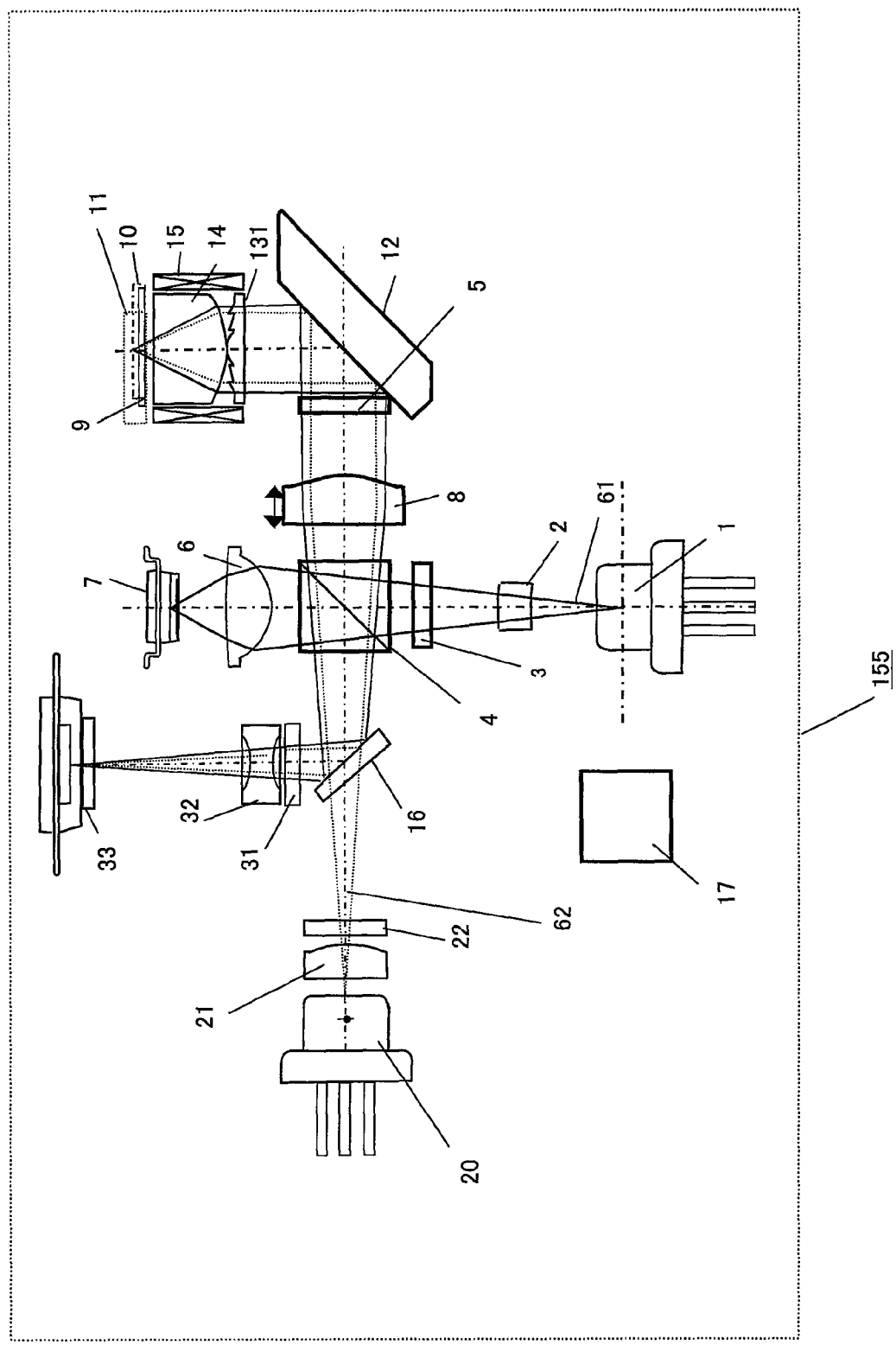
FIG. 2 is a diagram illustrating the optical head device according to Embodiment 1 of the present invention.

FIG. 2 is a diagram illustrating an optical head device according to the present embodiment which records and reproduces information on and from both a first-generation optical disk using infrared light for recording and reproduction and a second-generation optical disk using red light for recording and reproduction.

In FIG. 2, reference numeral 1 denotes a laser light source that emits blue light with a wavelength λ1 (390 nm to 415 nm: typically, about 408 nm). Reference numeral 20 denotes a laser light source that emits red light with a wavelength λ2 (630 nm to 680 nm: typically, a wavelength of 660 nm is often used) and infrared light with a wavelength λ3 (770 nm to 810 nm: typically, 780 nm). Reference numeral 8 denotes the collimate lens. Reference numerals 12 and 14 denote a rising mirror that bends the optical axis and the objective lens, respectively.

Reference numeral 9 shown in FIG. 2 denotes a third-generation optical disk having a base material thickness t1 of about 0.1 mm (a base material thickness of at most 0.1 mm including a manufacture error is referred to as a base material thickness of about 0.1 mm) or a smaller thickness and on and from which information is recorded and reproduced using a light beam of wavelength λ1.

Reference numeral 10 denotes a second-generation optical disk such as a DVD which has a base material thickness t2 of about 0.6 mm (a base material thickness of 0.5 mm to 0.7 mm including a manufacture error is referred to as a base material thickness of about 0.6 mm) and on and from which information is recorded and reproduced using a light beam of wavelength λ2.

Reference numeral 11 denotes a first-generation optical disk such as a CD which has a base material thickness t3 of about 1.2 mm (a base material thickness of 0.8 mm to 1.5 mm including a manufacture error is referred to as a base material thickness of about 1.2 mm) and on and from which information is recorded and reproduced using a light beam of wavelength λ3.

For the optical disks 9 and 10, only the base material extending from a light incident surface to a recording surface is shown in the figures. In reality, the base material is laminated to a protective plate in order to increase mechanical strength and to set an external thickness to 1.2 mm, which is the same as that of the CD. The optical disk 10 is laminated to a protective material of thickness 0.6 mm. The optical disk 9 is laminated to a protective material of thickness 1.1 mm. The optical disk 11 also includes a thin protective material. In the drawings of the present embodiment, the protective materials are omitted for simplification.

The illustrated configuration uses a 2-wavelength laser light source 20 that emits the wavelengths λ2 and λ3. However, separate light sources may be used for the respective wavelengths, and a dichroic mirror may be used to align optical paths of the light sources with each other.

The laser light sources 1 and 20 are preferably semiconductor laser light sources. This enables a reduction in the size, weight, and power consumption of the optical head device and the optical disk driving apparatus using the optical head device.

When information is recorded and reproduced on and from the optical disk 9 with the highest recording density, first, a blue light beam 61 of wavelength λ1 emitted by the laser light source 1 is reflected by a beam splitter 4. Then, the blue light beam 61 is changed to substantially parallel light by the collimate lens 8 and circularly polarized by a quarter wavelength plate 5. By way of example, the quarter wavelength plate 5 is designed to act, as a quarter wavelength plate, on both the wavelengths λ1 and λ2. The optical axis of the blue light beam 61 is bended by the rising mirror 12. The resultant blue light beam 61 is converged on an information recording surface (not shown in the drawings) through the base material of the optical disk 9, having a thickness of about 0.1 mm, by an optical element 131 and the objective lens 14. Here, for convenience of the drawing, the rising mirror 12 is shown to bend the light beam upward in the drawing. Actually, however, the optical axis of the light beam is bended toward the reader (or away from the reader) in a direction perpendicular to the drawing.

Furthermore, by moving the collimate lens 8 in the direction of the optical axis (the lateral direction of FIG. 1), the parallelism of the optical beam can be changed. Spherical aberration is caused not only by a change in temperature but also by an error in the thickness of the base material or the base material thickness including an interlayer thickness in the optical disk 9 including two layers. However, moving the collimate lens 8 in the optical axis direction allows the spherical aberration to be corrected.

Thus, the correction of the spherical aberration based on the movement of the collimate lens 8 can amount to several hundred mλrms if NA of the light converged on the optical disk is 0.85. The correction can be intended for a base material thickness of ±30 μm.

The blue light beam 61 reflected by the information recording surface follows the outward optical path in the opposite direction (homeward path). The blue light beam 61 is then changed, by the quarter wavelength plate 5, to linear polarization oriented in a direction perpendicular to the initial direction. The blue light beam 61 then passes almost totally through the beam splitter 4, and is totally reflected by a beam splitter 16 and then diffracted by a detection diffraction element 31. Moreover, the focal distance of the blue light beam 61 is increased by a detection lens 32. The blue light beam 61 then enters a photo detector 33.

An output from the photo detector 33 is calculated to obtain an information reproduction signal and a servo signal used for focus control and tracking control.

As described above, the beam splitter 4 includes a polarized light separating film which, for a light beam of the wavelength λ1, totally reflects linear polarization oriented in one direction while totally transmitting linear polarization oriented in a direction perpendicular to the one direction. Moreover, for a light beam of the wavelength λ2, the beam splitter 4 totally transmits a red light beam 62 and an infrared light emitted by the light source 20 as described below.

As described above, the beam splitter 4 is an optical-path diverging element having a polarization characteristic and wavelength selectivity. The polarization dependence may be eliminated from the beam splitter 4, and the quarter wavelength plate 5 may be omitted.

Then, when information is recorded and reproduced on and from the optical disk 10, first, a substantially linearly polarized light beam of wavelength λ2 emitted by the laser light source 20 passes through the beam splitters 16 and 4. Then, the light beam is changed to substantially parallel light by the collimate lens 8. The optical axis of the light beam is bended by the rising mirror 12. The light beam is converged on an information recording surface 101 through the base material of the optical disk 10, having a thickness of about 0.6 mm, by the optical element 131 and the objective lens 14.

The light beam reflected by the information recording surface follows the outward optical path in the opposite direction (homeward path). The light beam then passes almost totally through the beam splitter 4, and is totally reflected by the beam splitter 16 and then diffracted by the detection diffraction element 31. Moreover, the focal distance of the light beam is increased by a detection lens 32. The light beam then enters the photo detector 33.

An output from the photo detector 33 is calculated to obtain an information reproduction signal and a servo signal used for focus control and tracking control.

To obtain the servo signals for the optical disks 9 and 10 from the common photo detector 33 as described above, the blue laser 1 and red light emission points for the laser light source 20 are arranged such that an image is formed at the same position on the objective lens 14 side. This enables a reduction in the numbers of detectors and wiring lines.

The beam splitter 16 is a polarized light separating film which, for the wavelength λ2, totally transmits linear polarization oriented in one direction while totally reflecting linear polarization oriented in a direction perpendicular to the one direction. Moreover, for a light beam of the wavelength λ1, the beam splitter 16 totally reflects the blue light beam 61.

As described above, the beam splitter 16 is also an optical-path diverging element having a polarization characteristic and wavelength selectivity.

The polarization dependence may also be eliminated from the beam splitter 16, and the quarter wavelength plate 5 may also be omitted. An operation of allowing the light source to emit infrared light to record or reproduce information on or from the optical disk 11 is performed in the same manner as that of the operation of allowing the laser light source 20 to emit red light to record or reproduce information on or from the optical disk 10.

Here, the operation and configurations of the optical element 131 and the objective lens 14 will be described.

The optical element 131 is desirably configured such that a diffraction element and a refractive surface are combined so as to substantially inhibit a change in the parallelism of the blue light beam 61 of a design reference wavelength. When it is necessary to prevent a wave front of the blue light beam from being converted, the objective lens 14 is designed so as to converge substantially parallel light with the wavelength λ1 on the information recording surface through the base material thickness t1 of the optical disk 9.

Since the optical element 131 does not convert the wave front of the blue light beam, the relative positions of the optical element 131 and the objective lens 14 need not be accurately aligned with each other from the viewpoint of recording and reproduction on the optical disk 9.

Thus, for light with the shortest wavelength λ1, used to record and reproduce information on and from the optical disk 9 with the highest recording density, an allowable positional error for the positions of the objective lens 14 and the optical element 131 can be enlarged. Then, the relative positions of the optical element 131 and the objective lens 14 may be taken into account when recording or reproduction is preformed on an optical disk with a lower recording density using a light beam with a longer wavelength.

Consequently, the amount of allowable error in the relative position can be increased, allowing an optical head device with high productivity to be provided.

The wave front of the red light beam 62 with the wavelength λ2 is converted by the optical element 131.

Thus, a difference of the relative positions of the optical element 131 and the objective lens 14 from the designed positions prevents an as-designed wave front from entering the objective lens 14. This results in aberration in the wave front entering the optical disk 10, thus degrading converging characteristics. Thus, desirably, the optical element 131 and the objective lens 14 are integrally fixed to a support (not shown in the drawings), or the above-described diffraction element or a phase type element is formed directly on a surface of the objective lens 14, thereby common objective lens driving means 15 is used to drive the elements integrally with the objective lens 14 when focus control and tracking control are performed.

An additional effective example of the configuration of the whole optical head device is shown below. However, although each of these preferred configurations is effective, other configurations can be appropriately used.

In FIG. 2, a 3-beam grating (diffraction element) 3 is further placed between the blue laser 1 and the beam splitter 4 to enable a tracking error signal from the optical disk 9 to be detected by a well-known differential push pull (DPP) method.

A relay lens 2 is further placed between the blue laser 1 and the beam splitter 4 to enable the numerical aperture of collimate lens 8 side of the blue light beam 61 to be set to an appropriate value.

A 3-beam grating (diffraction element) 22 is further placed between the laser light source 20 and the beam splitter 16 to allow a tracking error signal from the optical disk 10 to be detected by the well-known differential push pull (DPP) method.

Alternatively, when an infrared light beam is used to record or reproduce information on or from the optical disk 11, the collimate lens 8 has been moved leftward in FIG. 2, that is closer to the laser light source 20. Thus, the infrared light beam toward the objective lens 14 can be changed to divergent light, and a converging spot on the optical disk 11 can be located away from the objective lens 14, and also aberration caused by a difference in base material thickness can be partly corrected to reduce the amount of aberration correction required of the optical element 131, to increase a diffraction element pitch. As a result, the optical element 131 can be easily produced.

Moreover, the beam splitter 4 is configured to allow part (for example, about 10%) of linear polarization light emitted by the blue laser 1 to be transmitted. The transmitted optical beam is further guided to the photo detector 7 desirably by the converging lens 6. Then, a signal obtained from the photo detector 7 can be used to monitor a change in the quantity of light emitted by the blue laser 1. Moreover, the light quantity change can be fed back to controllably maintain the emission light quantity of the blue laser 1 constant.

Moreover, the beam splitter 4 is configured to reflect part (for example, about 10%) of linear polarization light emitted by the laser light source 20. The reflected optical beam is then guided to the photo detector 7. Then, a signal obtained from the photo detector 7 can be used to monitor a change in the quantity of light emitted by the laser light source 20. Moreover, the light quantity change can be fed back to controllably maintain the emission light quantity of the laser light source 20 constant.

FIG. 2 shows the optical head device that is compatible with the optical disk on which information is recorded using the different types of light, that is, the infrared light, red light, and blue light. However, the present configuration is only illustrative, and the optical head to which the present invention is applicable is not limited to the configuration in FIG. 2. Specifically, the shapes and combination of the objective lens and the optical element need not be limited to the present configuration. For example, a number of objective lenses used to converge the infrared light, red light, and blue light may be provided such that the number of objective lenses corresponds to the number of the different types of light.

Figure 3:
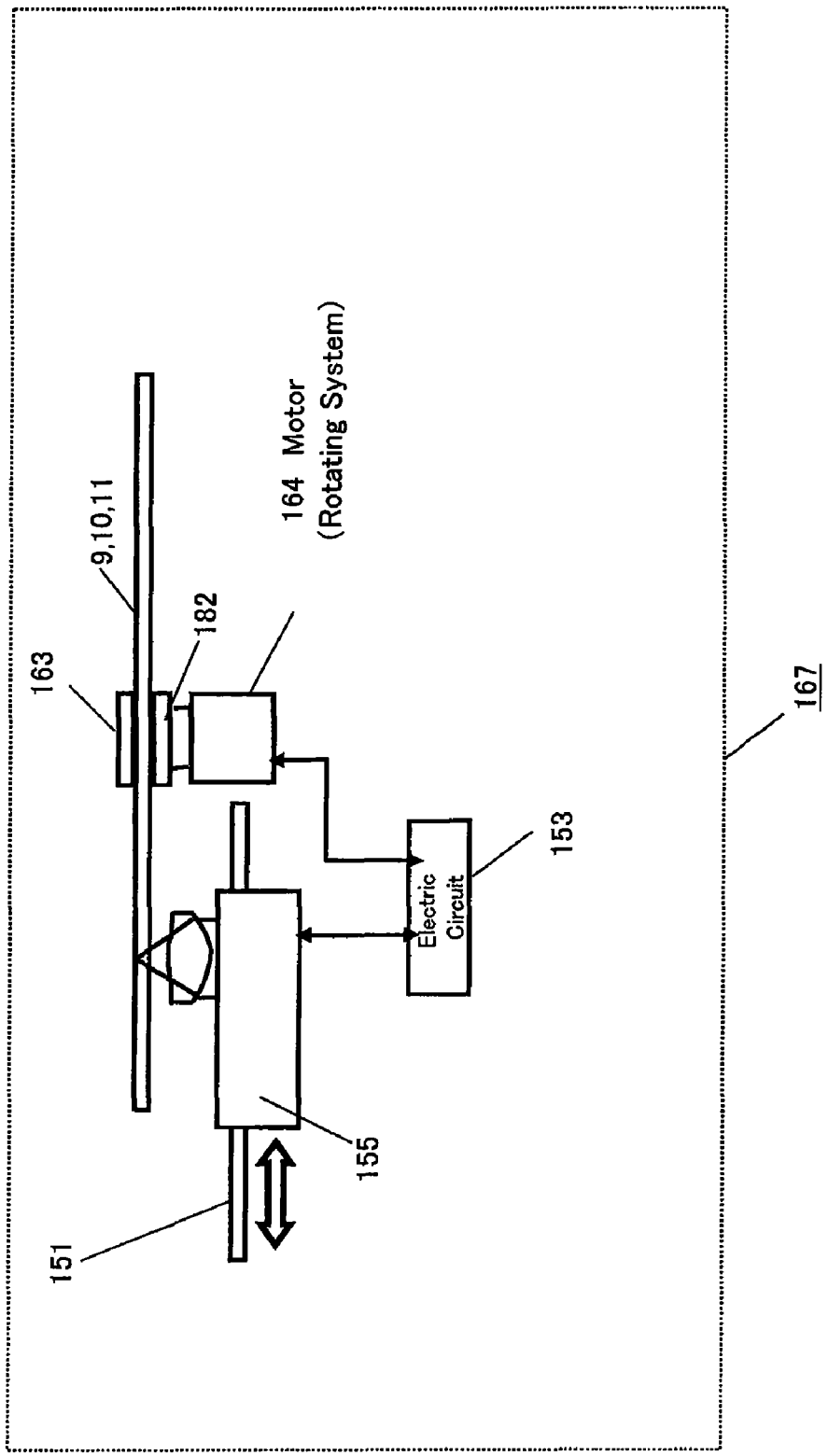
FIG. 3 is a diagram illustrating an optical disk driving apparatus according to Embodiment 1 of the present invention.

FIG. 3 shows an embodiment of the optical disk driving apparatus according to the present embodiment.

In FIG. 3, the optical disk 9 (or the optical disk 10 or 11; this also applies to the description below) is placed on a turn table 182 and pressed by a clamper 163 from above. The optical disk 9 is then rotated by a motor 164. An optical head device 155 described above with reference to FIGS. 1 and 2 is roughly moved by an optical head device driving device 151 to a track in the optical disk 9 where desired information is present.

The optical head device 155 transmits a focus error signal or a tracking error signal to an electric circuit 153 in accordance with the positional relationship between the optical head device 155 and the optical disk 9. In response to the focus error signal or a tracking error signal, the electric circuit 153 transmits a signal allowing the objective lens 14 to move slightly, to the optical head device 155. The transmitted signal allows the optical head device 155 to perform focus control or tracking control on the optical disk 9 to read information. In some cases, write (recording) or erasure is performed.

The optical disk driving apparatus according to the present embodiment uses the above-described optical head device according to the present invention, and can thus be inexpensively manufactured using an inexpensive resin objective lens.

Figure 4:
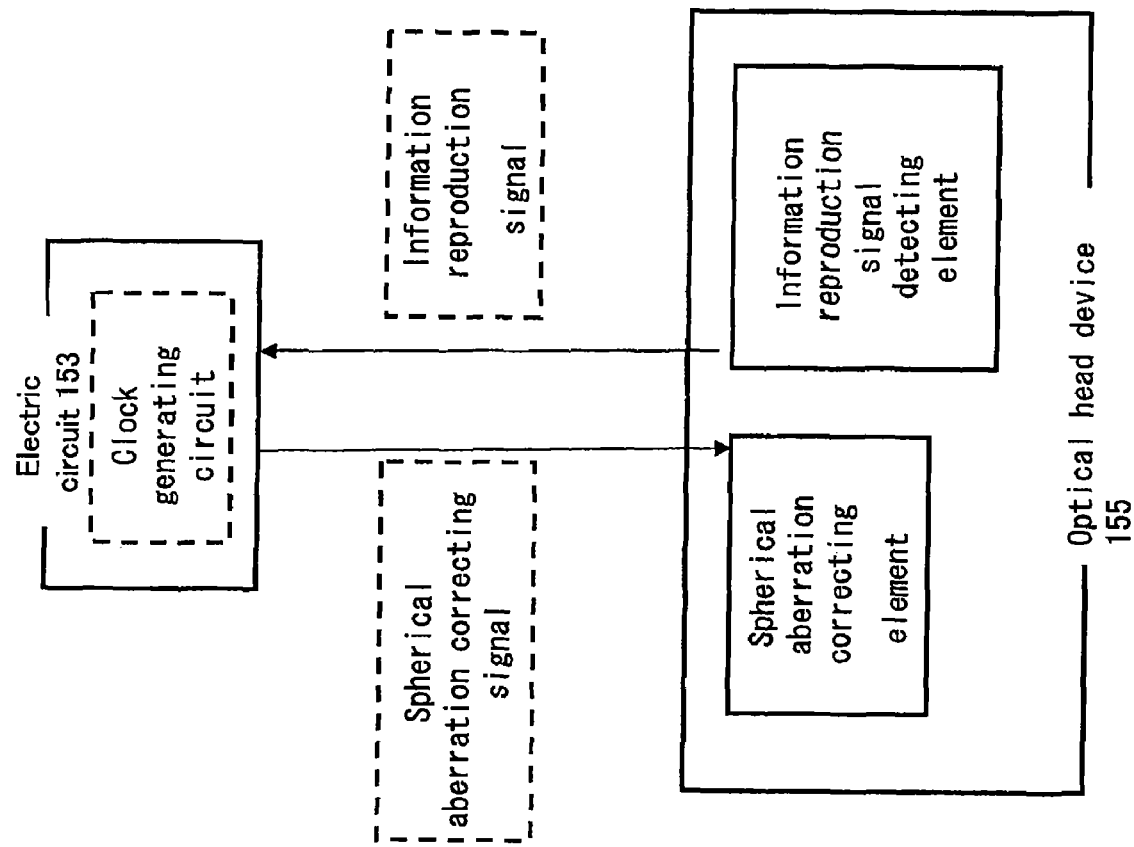
FIG. 4 is a diagram showing a relation between the optical head device according to Embodiment 1 of the present invention and an electric circuit.

FIG. 4 simply shows the relationship between the electric circuit 153 and the optical head device 155. The electric circuit 153 desirably includes a clock generating circuit but may be separately provided in the optical disk driving apparatus or the like. The electric circuit 153 transmits a spherical aberration correction signal to an aberration correcting optical system including a spherical aberration correcting element (corresponding to the collimate lens 8) in the optical head device 155. On the other hand, the optical head device 155 transmits an information reproduction signal to the electric circuit 153 through an information reproduction signal detecting element such as the photo detector 33.

An optical system including the objective lens 14, the optical element 131, and the like according to the present embodiment is an example of the converging optical system according to the present invention. An optical system including the collimate lens 8 and the driving means 18 according to the present embodiment is an example of the aberration correcting optical system according to the present invention. The collimate lens 8 according to the present embodiment is an example of the spherical aberration correcting element according to the present invention. The driving means 18 according to the present embodiment is an example of a driving section according to the present invention. The electric circuit 153 according to the present embodiment is an example of a control section according to the present invention.

Figure 5:
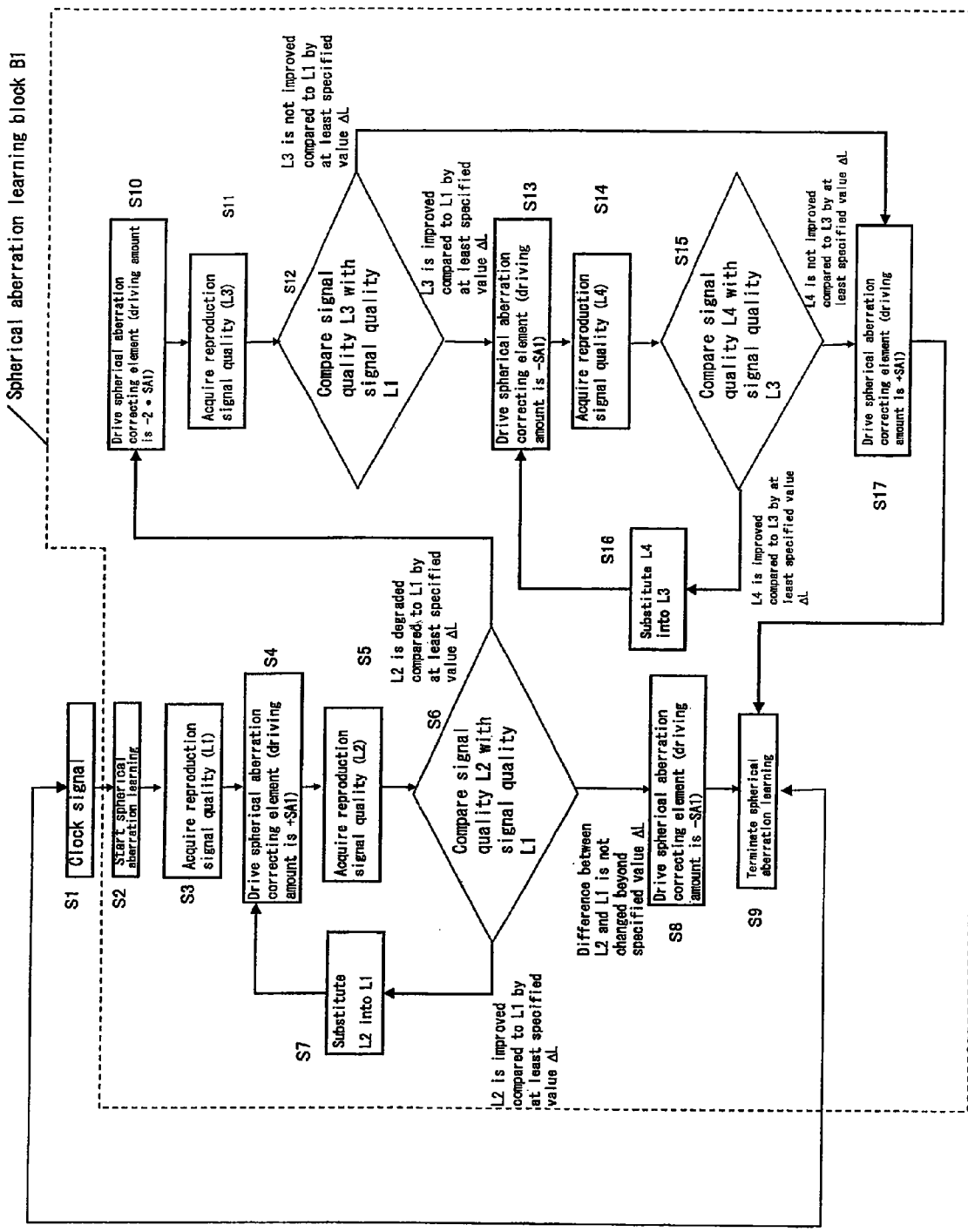
FIG. 5 is a flowchart showing a method of spherical aberration learning according to Embodiment 1.

FIG. 5 is a diagram illustrating a procedure of spherical aberration learning based on closed loop control as an embodiment of the method of correcting spherical aberration in the optical disk driving apparatus according to the present invention.

As shown in FIG. 5, in the present embodiment, an appropriate value for a spherical aberration correction amount is searched for at intervals of a constant time T.

In step S1, a clock signal (trigger signal) generated by a clock generating circuit (see the electric circuit 153 in FIG. 4) starts a search for the appropriate value for the spherical aberration correction amount (step S2).

Here, the constant time T, corresponding to the interval during which spherical aberration learning is started, is desirably set to be long in order to ensure a processing time during which reproduction signal quality described below is optimized utilizing spherical aberration and other parameters such as the offset amount of focus control, a waveform equalization coefficient for the reproduction signal, and the inclination of the objective lens 14. However, T needs to be set to be short in order to allow the amount of correction of spherical aberration to be changed while a change in spherical aberration caused by a change in temperature is insignificant.

In view of this, the constant time T is desirably at least about 1 second and at most about 10 minutes. For example, the constant time T is desirably about 10 seconds to 1 minute.

Then, the quality of a reproduction signal obtained from the optical head device 155 is evaluated to obtain an evaluation value L1 (step S3). Here, the evaluation value may be a jitter value indicating fluctuation in the signal, a deviation from a signal waveform estimated based on combination of a partial response and a maximum likelihood method (PRML: Partial Response Maximum Likelihood), or an error rate obtained during error correction (BER: Bit Error Rate) or the like. An information reproduction signal evaluating circuit and an evaluation value storing element are also provided in an optical disk driving apparatus 167. However, the circuit and the element may be a part of the electric circuit 153.

In step S4, the collimate lens 8, an example of the spherical aberration correcting element, is driven to change only the spherical aberration by +SA1.

The spherical aberration correcting element is desirably the collimate lens 8, described above. However, the spherical aberration correcting element may be a beam expander that is a combination of a concave lens and a convex lens or a liquid crystal type element.

It is necessary to avoid interrupting reproduction of signals by making the change of the spherical aberration amount SA1 too large. On the contrary, an excessively small SA1 value is undesirable in reducing time required to search for the appropriate value.

In view of this, SA1 is desirably at least 2 m$\lambda$rms and at most 20 m$\lambda$rms. More specifically, SA1 is desirably at least 3 m$\lambda$rms and at most 10 m$\lambda$rms, for example, about 5 m$\lambda$rms.

After the optical disk driving apparatus 167 is powered on, temperature increases, the refractive index of the resin decreases, and the third-order spherical aberration of the objective lens 14 is turned in the direction of over-spherical aberration. Therefore, to correct this, the positive or negative polarity of SA1 is desirably determined so that the third-order spherical aberration can be turned in the direction of under-spherical aberration. If the collimate lens 8 is used as a spherical aberration correcting element, the direction of under-spherical aberration corresponds to a direction away from the objective lens 14 along the optical axis direction. Initially setting SA1 in the direction of under-spherical aberration is effective for reducing the time required to search for the appropriate value.

In step S5, the quality of a reproduction signal obtained from the optical head device is evaluated again to obtain an evaluation value L2.

In step S6, the evaluation values L1 and L2 are compared with each other. Step S6 determines whether the evaluation value L2 is improved or degraded compared to the evaluation value L1 by at least a given value $\Delta$L, or $\Delta$L remains unchanged.

If the evaluation value L2 is improved compared to the evaluation value L1 by at least the given value $\Delta$L, the evaluation value L2 is substituted into the evaluation value L1 (step S7). Step S4 is then carried out again.

If $\Delta$L remains unchanged, in other words, if the change is smaller than $\Delta$L, the spherical aberration correcting element is driven to change the spherical aberration by −SA1 (step S8). That is, the spherical aberration is reversely changed so as to offset +SA1, corresponding to the amount by which the spherical aberration correcting element has been driven in step S4. Then, the search for the appropriate value for the spherical aberration correction amount, that is, spherical aberration learning, is terminated (step S9).

In step S6, if the evaluation value L2 is degraded compared to the evaluation value L1 by at least the given value ΔL, the process shifts to step S10.

In step S10, the collimate lens 8, which is the spherical aberration correcting element, is driven to change the spherical aberration by 2×(−SA1), that is, the spherical aberration is reversely changed by +SA1, corresponding to the amount by which the spherical aberration correcting element has been driven in step S4, and the spherical aberration is further reversely changed.

Then, in step S11, the quality of a reproduction signal obtained from the optical head device 155 is evaluated again to obtain an evaluation value L3.

In step S12, the evaluation values L1 and L3 are compared with each other. Step S12 determines whether or not the evaluation value L3 is improved compared to the evaluation value L1 by at least the given value ΔL. If the evaluation value L3 is improved compared to the evaluation value L1 by at least the given value ΔL, the process shifts to step S13 to change the spherical aberration again.

In step S12, if the evaluation value L3 is not improved compared to the evaluation value L1 by at least the given value ΔL, the collimate lens 8, which is the spherical aberration correcting element, is driven to change the spherical aberration by +SA1 (step S17). That is, in step S10, the spherical aberration is reversely changed by −SA1 so as to offset the amount +SA1, corresponding to the amount by which the spherical aberration correcting element has been driven in step S4, and the spherical aberration is further changed by −SA1. In step S17, the spherical aberration is changed by +SA1 to offset the change corresponding to −SA1. Then, the search for the appropriate value for the spherical aberration correction amount, that is, spherical aberration learning, is terminated (step S9).

In step S12, if the evaluation value L3 is improved compared to the evaluation value L1 by at least the given value ΔL and the process shifts to step S13, the spherical aberration is further changed by −SA1.

Moreover, in step S14, the quality of a reproduction signal obtained from the optical head device is evaluated again to obtain an evaluation value L4.

In step S15, the evaluation values L3 and L4 are compared with each other. Step S15 determines whether or not the evaluation value L4 is improved compared to the evaluation value L3 by at least the given value ΔL.

If the evaluation value L4 is improved compared to the evaluation value L3 by at least the given value ΔL, the evaluation value L4 is substituted into the evaluation value L3 (step S16). The process then shifts to step S13.

In step S15, if the evaluation value L4 is not improved compared to the evaluation value L3 by at least the given value ΔL, the collimate lens 8, which is the spherical aberration correcting element, is driven to change the spherical aberration by +SA1 (step S17). That is, the amount by which the spherical aberration correcting element has been driven in step S13 is offset. Then, the search for the appropriate value for the spherical aberration correction amount, that is, spherical aberration learning, is terminated (step S9).

In this manner, the spherical aberration correction is performed, and the change in reproduction signal quality is evaluated. The spherical aberration correction amount is then changed in the direction in which the evaluation value is improved. Then, the appropriate spherical aberration correction can be performed without being affected by an error in the temperature sensor or the like. Therefore, the effect that information can be properly reproduced from the optical information medium with the high recording density using the inexpensive resin objective lens is obtained.

A portion of FIG. 5 enclosed by a dotted line and containing steps S2 to S17 corresponds to the spherical aberration learning, in other words, the procedure of the search for the optimum spherical aberration. The portion as a whole is referred to as a spherical aberration learning block B1 (step B1). The spherical aberration learning block B1 is a procedure of searching for a spherical aberration correction amount optimum or nearly optimum for achieving the highest reproduction signal quality.

In step S10 of Embodiment 1, the amount by which the spherical aberration correcting element is driven is −2×SA1. However, this may be, for example, −SA1+SA1' (SA1'≠SA1).

Embodiment 2

Now, an embodiment of a method of correcting spherical aberration in the optical disk driving apparatus according to the present invention will be described.

Figure 6:
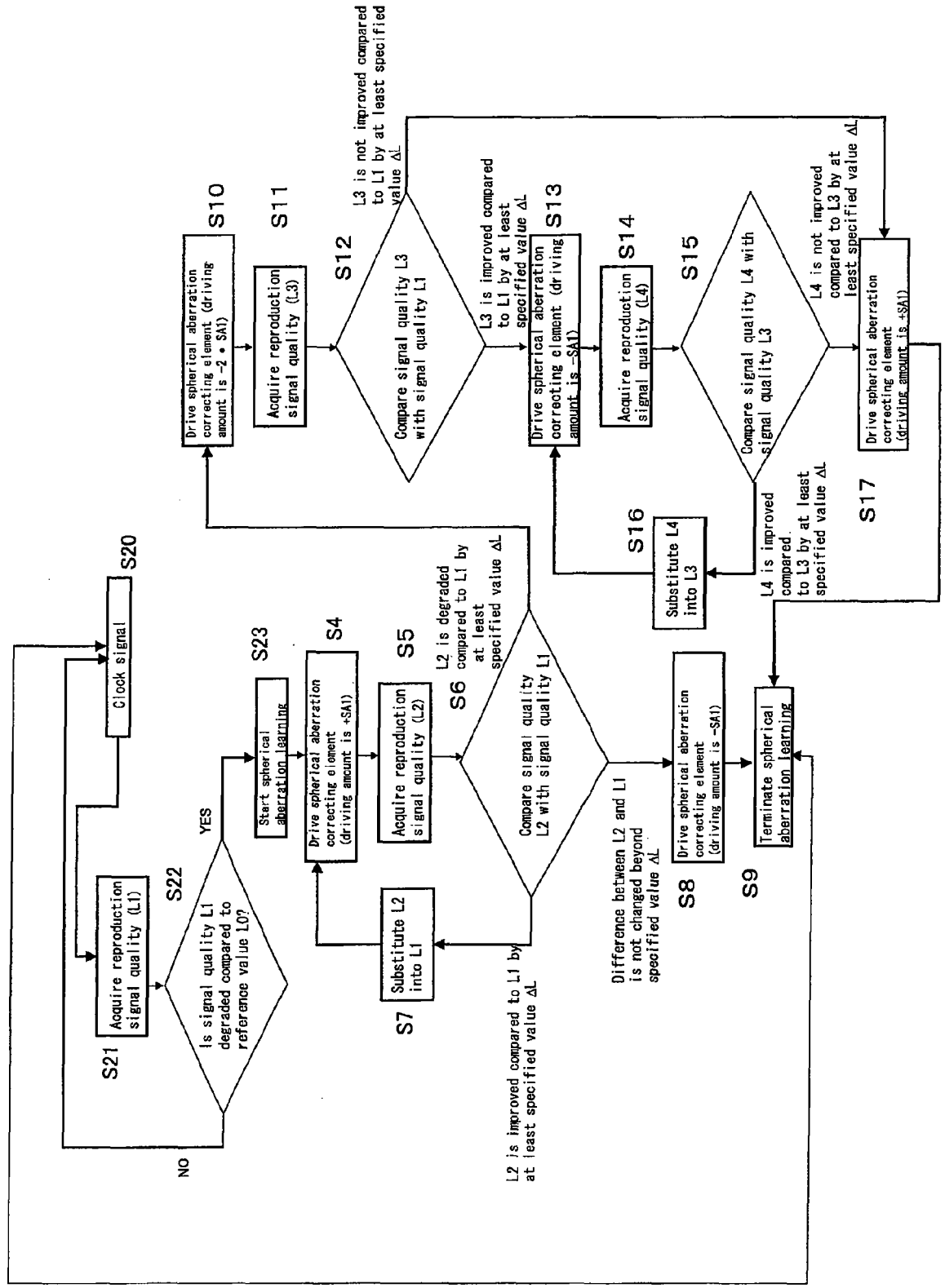
FIG. 6 is a flowchart showing a method of spherical aberration learning according to Embodiment 2.

FIG. 6 is a diagram illustrating a procedure of spherical aberration learning as an embodiment of the method of correcting spherical aberration in the optical disk driving apparatus according to the present invention.

Steps S4 to S17 in FIG. 6 are the same as those in FIG. 5 for the above-described first embodiment. However, FIG. 6 is different from FIG. 5 in that FIG. 6 includes additional steps (S21 and S22) of determining whether or not to start spherical aberration learning based on the signal quality. The same steps as those in FIG. 5 are carry the same reference numerals and description of these steps is omitted.

The configurations of the optical disk device and optical disk driving apparatus used in the present embodiment are basically the same as those described with reference to FIGS. 1 to 4. The same components as those in FIGS. 1 to 4 will not be described.

As shown in FIG. 6, in step S20, a clock signal (trigger signal) allowing step S21 to be started is issued at a predetermined timing. Based on an instruction in the clock signal, the reproduction signal quality L1 is acquired in step S21.

Then, step S22 determines whether or not the L1 is degraded compared to reference signal quality L0. If the L1 is not degraded compared to reference signal quality L0, the process returns to step S20.

Here, a time interval T2 until the next clock signal is issued in step S20 may be shorter than a time interval T1 for the clock signal in step S1 (see FIG. 5); the time interval T2 may be between 0.1 second and 10 seconds. This is because in step S21, only the acquisition of the reproduction signal quality L1 is performed and the spherical aberration learning, which is the closed loop control, is not performed.

For example, the L1 may be a value obtained by measuring the reproduction signal quality every second and averaging a plurality of evaluation values.

On the other hand, if step S22 determines that the L1 is degraded compared to the reference signal quality L0, the spherical aberration learning is started (step S23). Step S4, following step S23, and the subsequent steps are the same as those in FIG. 5 and thus will not be described. In this method, an effect that the signal can be reproduced more with stability is obtained by minimizing the frequency at which the closed loop control, which changes the spherical aberration for learning, is performed.

In addition to the process of varying the spherical aberration correction amount, a search for optimum points for the other parameters is desirably performed. For example, the optimum point for the offset amount of the focus control signal is searched for. Like the spherical aberration correction amount, the offset amount of the focus control signal is changed. The resulting reproduction signal quality is evaluated by means of comparison. The offset amount of the focus control signal is then changed to an appropriate value. Furthermore, the waveform equalization coefficient for the reproduction signal is changed similarly to the spherical aberration. The resulting reproduction signal quality is evaluated by means of comparison. The waveform equalization coefficient is then changed to an appropriate value. Additionally, to allow the inclination of the objective lens to be corrected, the inclination is changed similarly to the spherical aberration correction amount. The resulting reproduction signal quality is evaluated by means of comparison. The inclination is then changed to an appropriate value.

In the above-described first embodiment, if in addition to the optimum point for spherical aberration, the optimum points for the offset amount of the focus control signal, the waveform equalization coefficient, and the inclination of the objective lens are sequentially searched for, a longer time interval needs to be set for the generation of the clock signal in step S1 (see FIG. 5).

Since the temperature changes momentarily even if during a single optical disk is being reproduced, there is a possibility that the spherical aberration continues changing. Thus, real-time spherical aberration correction is seemingly preferable. However, to search for the optimum point for the spherical aberration, the spherical aberration is intentionally changed to allow determination of whether or not the reproduction signal is improved as a result of the change. Continuing the real-time search for the optimum point for the spherical aberration means the intentional change of the spherical aberration during most of the time for the signal reproduction. Thus, the reproduction quality may be disadvantageously averagely degraded.

In this regard, the optimum point for the spherical aberration is desirably intermittently searched for as described above in Embodiments 1 and 2 with reference to FIGS. 5 and 6. That is, intermittently activating the trigger allowing the spherical aberration learning to be started enables a reduction in the frequency of intentional changes in spherical aberration. Thus, there is an effect that the average degradation of the reproduction signal quality can be avoided. Main events each of which can be used as the trigger are as follows.

(1) In the configuration according to Embodiment 1, the intermittent process of searching for the optimum point for the spherical aberration (spherical aberration learning block B1) can be started at constant time intervals, for example, every 10 seconds, every 30 seconds, every minute, or at intervals of a constant clock count. The constant time intervals correspond to the intervals at which the clock signal is issued in step S1 in FIG. 5.

(2) In the configuration according to Embodiment 2, shown in FIG. 6, the process of searching for the optimum point for the spherical aberration (see step S23) is started when the quality of the reproduction signal is degraded compared to the reference value L0 (see step S22).

(3) Alternatively, a temperature sensor 17 may be mounted in the optical head device 155 so that the process of searching for the optimum point for the spherical aberration can be started when the sensor senses that the temperature has changed by at least a given value (for example, at least 5° C.). This is also a kind of intermittent spherical aberration learning. An example of this configuration will be described with reference to FIG. 5 as a substitute.

That is, in this example, the temperature change amount is acquired constantly or every time the clock signal is issued at predetermined time intervals. If a temperature change amount equal to or larger than a preset reference value is sensed, a trigger signal allowing the processing in the spherical aberration learning block B1 to be started is issued for step S2. The processing in steps S2 to S17 is the same as that in FIG. 5.

This allows both of two effects to be exerted, that is, a change in spherical aberration caused by a change in temperature can be reduced to a small given value or less, and the average degradation of the reproduction signal quality can be avoided.

The given temperature change amount is desirably set to at most 10° C. in order to minimize the spherical aberration caused by the temperature change. Furthermore, the given temperature change amount is desirably set to at least 5° C. in order to avoid the average degradation of the reproduction signal quality as a result of frequent searches for the optimum point for the spherical aberration.

Thus, the given temperature change amount is desirably set within the range from 5° C. to 10° C.

(4) Alternatively, the spherical aberration learning may be started when a seek position of the optical head device 155 has changed by at least a given value (for example, 5 mm or 10 mm) in a radial direction of the optical disk. An example of this configuration will be described with reference to FIG. 5 as a substitute.

That is, in this example, a travel distance over which the optical head device 155 has traveled in the radial direction is acquired every time the clock signal is issued at the predetermined time intervals. If the travel distance equal to or larger than a preset given value is sensed, the trigger signal allowing the processing in the spherical aberration learning block B1 to be started is issued for step S2. The processing in steps S2 to S17 is the same as that in FIG. 5.

Here, a change in seek position is used as a trigger for the spherical aberration learning because the thickness of the transparent base material may vary depending on the radius of the optical disk and then the spherical aberration may change accordingly to the variety of the thickness.

Based on items (1) to (4) described above, the main events each of which can be used as the trigger allowing the spherical aberration learning to be started can be summarized as follows.

That is, the process of the spherical aberration learning, which is the closed loop control, is preferably started when at least any one of the following events occurs: (1) the predetermined time elapses (see FIG. 5), (2) the value of the reproduction signal quality degraded compared to the predetermined reference value (see FIG. 6), (3) the temperature changes by at least the given value, and (4) the radial travel distance of the optical head device changes by at least the given value.

Now, an embodiment in which for example, not only the above-described closed loop control but also the open loop control is used for the spherical aberration correction to make up for disadvantages of the closed loop control will be described.

Embodiment 3

Now, an embodiment of the method of correcting spherical aberration in the optical disk driving apparatus according to the present invention will be described with reference to FIG. 7.

In the present embodiment, a trigger for the closed loop control is the "elapse of a first predetermined time". A trigger for the open loop control is the "elapse of a second predetermined time" which has the interval shorter than that of the trigger for the closed loop control.

The configurations of the optical disk device and optical disk driving apparatus used in the present embodiment are basically the same as those described with reference to FIGS. 1 to 4. The same components as those in FIGS. 1 to 4 will not be described.

In the configuration described above in Embodiment 1, the spherical aberration learning is performed when the clock signal is issued in step S1 in FIG. 5. That is, in FIG. 5, the spherical aberration learning is intermittently performed every time the first predetermined time elapses. After the spherical aberration learning block B1 (step B1) is completed and before the next clock signal is issued during step S1, that is, during what is called a standby period, even if the spherical aberration is changed by a change in the temperature of the vicinity of the objective lens 14, a process of correcting the change is not executed.

In contrast, in the present embodiment, during the standby period, the second predetermined time is used as a trigger to perform the open loop control in a supplementary manner to correct the spherical aberration according to the temperature change amount (temperature difference) of the vicinity of the objective lens 14.

Causes of a change in the temperature of the objective lens 14 and the vicinity thereof caused by driving of the optical disk driving apparatus 167 are roughly classified into (1) a change in outside air temperature, (2) heating resulting from driving of the laser light source or a circuit operation, and (3) the Joule heat of current flowing through an actuator. In particular, the temperature change caused by the actuator may cause a rapid change to occur in a short time compared to the other factors.

Thus, in the configuration in FIG. 5, which starts the closed loop control every time the predetermined time elapses to intermittently perform the spherical aberration correction, a significant spherical aberration may occur after the closed loop control is completed and before the next closed loop control is started.

On the other hand, if a temperature sensor is attached to the objective lens 14, an increase in weight may degrade servo characteristics, or an increase in the number of feeding terminals may complicate the optical head device 155.

Thus, in the present embodiment, a detection result from the temperature sensor 17 located in the vicinity of the blue laser light source 1 and the value of the current flowing though the actuator are utilized to calculate a change in the temperature of the vicinity of the objective lens 14 occurring after the spherical aberration learning is completed and before the next spherical aberration learning is started. Then, the spherical aberration is corrected by the amount corresponding to the change in temperature.

The reason for the combination of the temperature sensing by the temperature sensor and the sensing of the current through the actuator will be described below in further detail.

Operation of the present embodiment will be described below with reference to FIG. 7.

Figure 7:
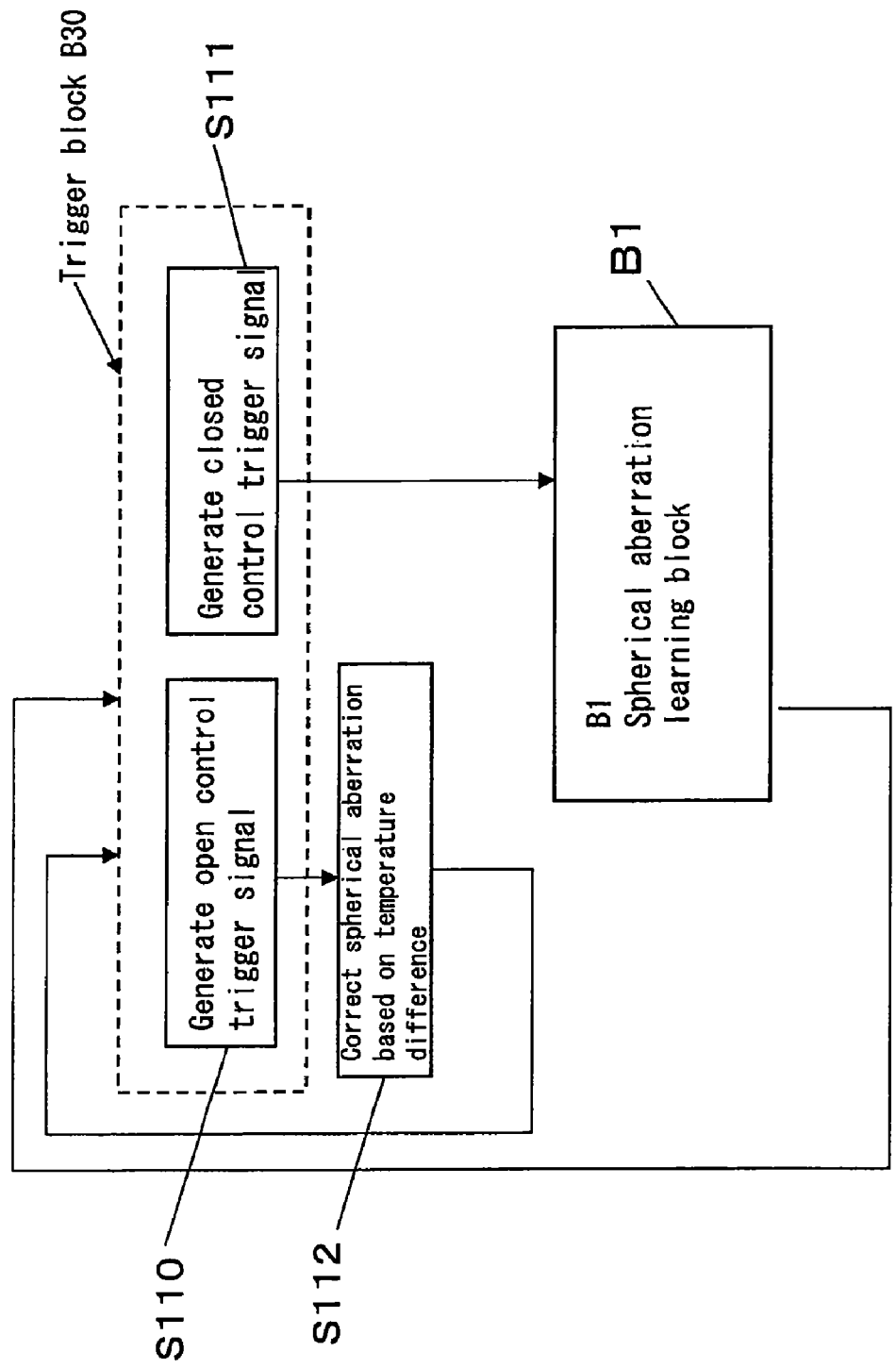
FIG. 7 is a flowchart showing a method of spherical aberration learning according to Embodiment 3.

As shown in FIG. 7, the present embodiment includes step S111 of issuing a closed control trigger signal allowing the spherical aberration learning block B1 (step B1) to be carried out as the closed loop control. The present embodiment also includes step S110 of issuing an open control trigger signal allowing the open loop control to be performed for each of the intervals of the second predetermined time, during each of the intervals of the first predetermined time at which the closed control trigger signal is issued. The present embodiment further includes, as the open loop control, step S112 of correcting the spherical aberration according to the temperature change amount (temperature difference) of the vicinity of the objective lens 14 between different points in time. Steps S110 and S111 are collectively referred to as a trigger block B30.

Now, the operation of the present embodiment will be described with reference to the flowchart in FIG. 7.

When the closed control trigger signal is issued in step S111, the process proceeds to step B1 to perform the spherical aberration learning.

On the other hand, in step S110, the open control trigger signal is issued at intervals shorter than those at which the closed control trigger signal is issued in step S111.

Upon receiving the open control trigger signal from step S110, step S112 determines the temperature change amount (temperature difference) of the periphery of the objective lens 14 using the temperature sensing result from the temperature sensor 17 and the value of the current flowing through the actuator. Then, based on the prepared relationship between the temperature difference and the travel distance of the collimate lens 8, the travel distance corresponding to the temperature change amount determined as described above is obtained. The collimate lens 8 is then moved to correct the spherical aberration.

Provided that the determined temperature difference exhibits at most a predetermined value, the correction of the spherical aberration based on the open loop control may be omitted.

Thus, the present embodiment performs the open loop control according to the temperature change amount of the periphery of the objective lens 14 using the predetermined time intervals as a trigger, after the closed loop control is completed and before the next closed loop control is started. Thus, the reproduction signal quality can be more precisely improved.

Now, a method of calculating the temperature change amount of the vicinity of the objective lens 14 will be described in further detail.

That is, the temperature sensor 17 is used to obtain the temperature change amount. Furthermore, the amount of the current flowing through the actuator to slightly move the objective lens 14 is monitored to calculate the temperature change amount of the vicinity of the objective lens based on the current amount.

The term "temperature change amount" as used herein refers to a temperature change amount obtained by comparing the temperatures measured at the same position in the vicinity of the objective lens 14 at different points in time t1 and t2.

When the collimate lens 8 is moved in the optical axis direction to correct the spherical aberration, the travel distance M of the collimate lens 8 can be calculated by Formula (1).

$$M = \text{the temperature change amount calculated from the value of the current through the actuator} \times K1 + \text{the temperature change amount from the temperature sensor} \times K2 \quad \text{(Formula 1)}$$

Here, K1 and K2 are correction coefficients to which experimentally calculated values can be appropriately set.

Thus, the spherical aberration can be accurately corrected even with the open loop control.

When the configuration in which the current value of the actuator is monitored is adopted, even if a large current flows through the actuator to abruptly change the temperature, the open loop control is controlled even during the standby period for the closed loop control. This is effective for quickly inhibiting degradation of the quality of the reproduction signal.

Now, the reason for the combination of the temperature sensor and the sensing of the current through the actuator will be described.

As described above, the temperature sensor 17 is desirably located in the vicinity of the blue laser light source 1. However, in this case, the temperature sensor 17 is located away from the objective lens 14. Of course, a plurality of the temperature sensors 17 can be provided. However, this increases the number of components and is disadvantageous in terms of costs.

On the other hand, a lighter movable portion of the actuator which slightly moves the objective lens 14 can achieve the slight movement at a higher speed. Thus, a magnet and a coil making up a driving force source are desirably arranged such that the magnet is placed on a fixed side, whereas the coil is placed on a movable side. Placing the temperature sensor on the movable side is not preferable as already described.

In this configuration, the change in the temperature of the vicinity of the objective lens 14 is affected by both a rise in the temperature caused by the current flowing through the coil and a rise in temperature caused by heat from the blue laser light source 1.

Thus, the present embodiment multiplies the temperature change amount obtained from the temperature sensor 17 by a preset coefficient and adds the multiplication result to the temperature change amount of the vicinity of the objective lens calculated from a change in the value of the current flowing through the coil of the actuator. Thus, the temperature change amount of the vicinity of the objective lens 14 can be accurately obtained.

The travel distance M of the collimate lens 8 can be calculated by multiplying the addition result by a predetermined coefficient (see Formula 1). The predetermined coefficient can be experimentally determined. Consequently, the spherical aberration can be accurately corrected.

Since a heating value is proportional to the square of the current value I, when A is defined as a constant, the amount $\Delta TI$ by which the temperature is raised by the coil is expressed by:

$$\Delta TI = AI^2 \quad \text{(Formula 2)}$$

where $^2$ denotes squaring.

The movable portion needs to move in a plurality of directions including a focus direction and a tracking direction. Thus, a plurality of coils are normally mounted in the movable portion. Consequently, a plurality of currents flow. In this case, current values are denoted by I1, I2, . . . IN, and corresponding coefficients are denoted by A1, A2, . . . , An. Then, the following formula holds true.

$$\Delta TI = \Sigma A k I k^2 \quad \text{(Formula 3)}$$

In Formula 3, $\Sigma$ denotes the sum of the current values for k=1, 2, . . . N.

If the temperature sensor 17 is located in the vicinity of a semiconductor laser light source, light emission from the laser light source is desirably stopped when the temperature senses that temperature of the laser light source has exceeded a given value. This is also concomitantly effective for preventing a possible situation in which the temperature rises to make the value of a driving current from a power source equal to or larger than a rated value, thus destroying the semiconductor laser light source.

Embodiment 4

Now, an embodiment of the method of correcting spherical aberration in the optical disk driving apparatus according to the present invention will be described with reference to FIG. 8.

In the present embodiment, the trigger for the closed loop control is a "change in temperature". The trigger for the open loop control is a "change in temperature".

In the present embodiment, if the temperature of the vicinity of the objective lens 14 changes during the standby period for the closed loop control, when the value of the temperature change is larger than the reference value $\Delta T$, the closed loop control is performed. When the value of the temperature change is smaller than the reference value $\Delta T$, the open loop control is performed.

The configurations of the optical disk device and optical disk driving apparatus used in the present embodiment are basically the same as those described with reference to FIGS. 1 to 4. The same components as those in FIGS. 1 to 4 will not be described.

Furthermore, for the method of determining the temperature change amount based on the value from temperature sensor 17 and the current value of the actuator to calculate the travel distance M of the collimate lens 8 for the open loop control using Formula 1, the contents of the method are the same as those described in Embodiment 3 and thus will not be described below.

Thus, a deviation in spherical aberration which may occur after the closed loop control is completed and before the next closed loop control is started can be quickly corrected by the open loop control.

Operation of the present embodiment will be described with reference to a flowchart shown in FIG. 8.

In step S20, the clock signal is issued at preset time intervals ($\tau t$). When the clock signal is issued, step S301 checks whether or not the spherical aberration learning block B1 (step B1) has been carried out. If the spherical aberration learning block B1 (step B1) has been carried out, the process proceeds to step 302. If the spherical aberration learning block B1 (step B1) has not been carried out, the process proceeds to step B1.

In step 302, temperature data Dt2 on the vicinity of the objective lens 14 at the current point in time (t2) is acquired based on the detection result from the temperature sensor 17 and the value of the current flowing through the actuator.

In step 303, a value Dt12 corresponding to the absolute value of a temperature difference is determined from the temperature data Dt2 acquired in step 302 and temperature data Dt1 on the vicinity of the objective lens acquired during the last spherical aberration learning (t1) as described above. The value Dt12 is then compared with the preset reference value $\Delta T$. If the Dt12 is larger than the reference temperature $\Delta T$, the process proceeds to step B1. If the Dt12 is smaller than the reference temperature $\Delta T$, the process proceeds to step 304.

Step 304 determines whether or not the absolute value (Dt12) of the temperature difference is smaller than a predetermined threshold value. If the determination result indicates the absolute value is smaller than the threshold value, the process executes nothing and returns to step S20. If the determination result indicates the absolute value is larger than the threshold value, the process proceeds to step S305.

In step 305, based on the temperature data Dt1 and Dt2, the travel distance M of the collimate lens 8 required to correct the spherical aberration is determined utilizing Formula 1, described above. The spherical aberration is thus corrected by the open loop control based on the temperature difference. The process then returns to step S20 again.

In step S301, provided that the processing in the spherical aberration learning block B1 has already been carried out following the power-on and stabilization of the optical disk driving apparatus, the process proceeds to step S302. Thus, whether or not the process further proceeds to step B1 depends on the determination result in step S303. Depending on the determination result in step S303, the processing in step B1, corresponding to the closed loop control, may not be carried out for a long period. Thus, instead of being limited to the above-described configuration, for example, the present embodiment may include an additional function of activating a second trigger to allow the process to inevitably proceed to step B1 when a preset time ($\tau$b; $\tau$b>$\tau$t) elapses after the execution of the last spherical aberration learning B1 (step B1).

As described above, the present embodiment include, in a supplementary manner, step S305 of performing the open loop control based on the temperature difference in the vicinity of the objective lens 14, after the execution of the spherical aberration leaning block B1, corresponding to the closed loop control, and before the execution of the next spherical aberration learning block B1.

Furthermore, if the temperature change occurring before the start of the intermittent spherical aberration learning block B1 is larger than the reference value $\Delta$T, the process proceeds to step B1 for the closed loop control instead of step S305 for the open loop control. This minimizes the adverse effect of errors in the measurement by the temperature sensor 17.

The use of the combination of the closed loop control and the open loop control in the stable state has been described. Now, an exceptional control method used when the optical disk driving apparatus is powered on (started up) will be described.

Embodiment 5

Another embodiment of the method of correcting spherical aberration in the optical disk driving apparatus according to the present invention will be described with reference to FIG. 9.

In the present embodiment, a configuration will be described in which the spherical aberration is corrected based on the open loop control when the optical disk driving apparatus according to the present embodiment is powered on (started up).

The configurations of the optical disk device and optical disk driving apparatus used in the present embodiment are basically the same as those described with reference to FIGS. 1 to 4. The same components as those in FIGS. 1 to 4 will not be described.

As shown in FIGS. 1 and 2, in the configuration in which the temperature sensor 17 is provided in the optical head device 155, for a certain time, for example, about 10 minutes, after the optical disk driving apparatus 167 is powered on, the temperature sensor 17 measures the temperature change amount and the open loop control may also be performed so that the spherical aberration correction amount can be changed according to the temperature change amount. For a certain time after the optical disk driving apparatus 167 is powered on, the temperature often varies rapidly. Thus, the spherical aberration learning corresponding to the closed loop control may fail to deal with the temperature variation in time. Accordingly, the open loop control may be used as auxiliary means for the spherical aberration learning process.

Figure 9:
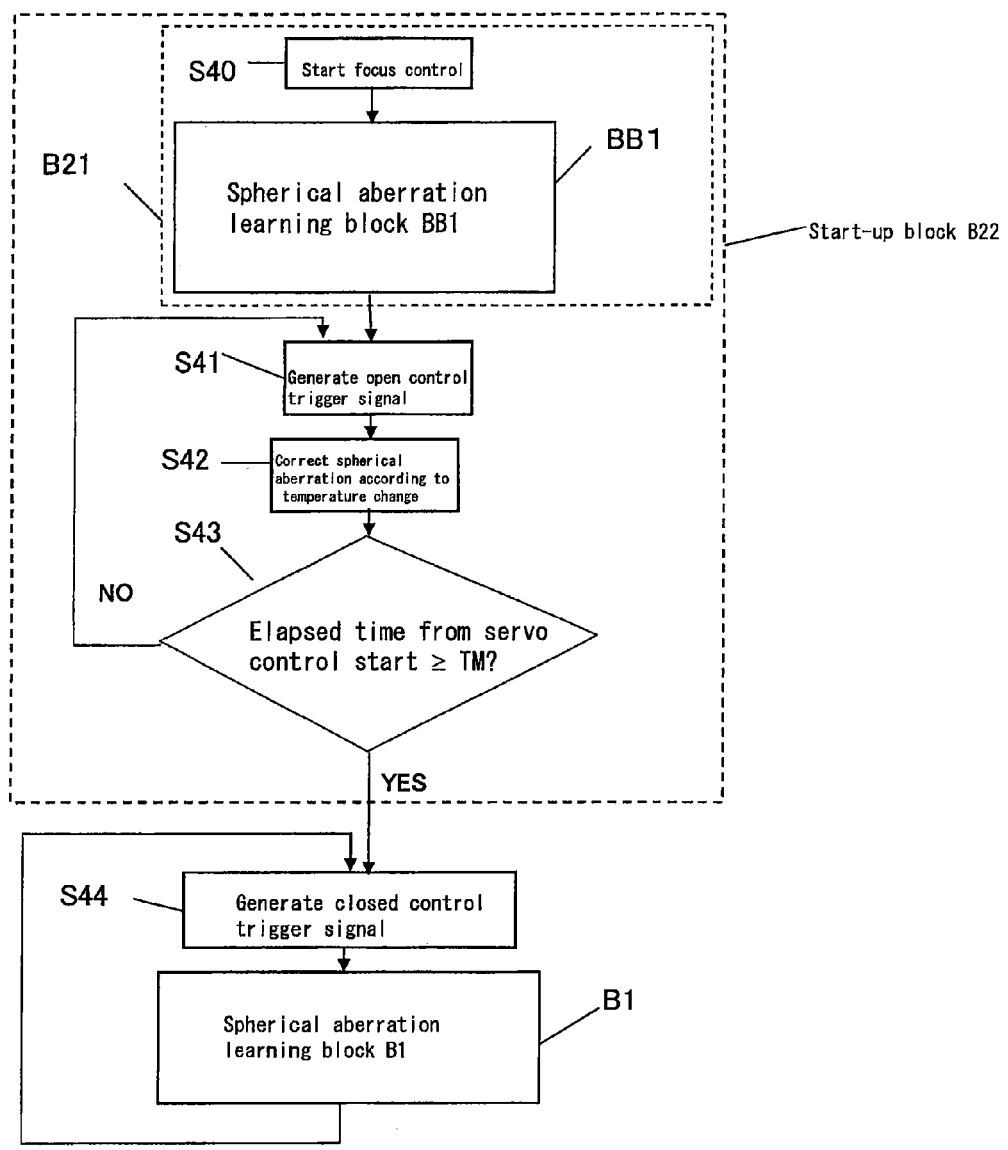
FIG. 9 is a flowchart showing a method of spherical aberration learning according to Embodiment 5.

FIG. 9 shows an example of a procedure of performing the temperature-based spherical aberration correction based on the open loop control for a certain time after the optical disk driving apparatus 167 is powered on or the focus control is turned on for the optical disk 9.

Now, operation of the present embodiment will be described with reference to a flowchart in FIG. 9.

As shown in FIG. 9, when in step S40, the focus control is started or the optical disk driving apparatus 167 is powered on, a spherical aberration learning block BB1 corresponding to the closed loop control is forcibly carried out only once. The contents of the processing in the spherical aberration learning block BB1 are the same as those in the spherical aberration learning block B1. The processing in steps 40 to BB1 is collectively referred to as step B21.

When step BB1 is completed, the process proceeds to step S41 to generate the open control trigger signal at preset time intervals.

In step S42, basically the same processing as that in steps S302 and S305, described above in Embodiment 4 with reference to FIG. 8, is carried out. That is, upon receiving the open control trigger signal generated in step S41, step S42 utilizes Formula 1, described above, to determine the travel distance M of the collimate lens required to correct the spherical aberration based on the already acquired temperature data Dt1 on the vicinity of the objective lens 14, and the temperature data Dt2 on the vicinity of the objective lens 14 acquired based on the temperature sensed by the temperature sensor 17 and the value of the current flowing through the actuator at the time of the start of step S42.

Here, when the first open loop control is performed, the temperature data which was already acquired in step BB1 is used as the temperature data Dt1. Thereafter, when the open loop control is repeated, the temperature data which was last acquired in step S42 is used as the temperature data Dt1.

The open loop control is repeatedly performed after the focus control is started in step S40 (or the optical disk driving apparatus is power on) and until a given time TM elapses (step 43). The time TM is the amount of time until the variation in the temperature of the optical disk driving apparatus becomes moderate; the appropriate time is about 5 to 10 minutes, or about 20 minutes.

When step S43 determines that the time TM has elapsed since the start of the servo control, the process proceeds to step S44. Upon receiving the closed control trigger signal from step S44, the process proceeds to step B1 to carry out the spherical aberration learning block B1, corresponding to the closed loop control. Operations in steps S44 and B1 are the same as those described with reference to FIGS. 5 and 6.

Since the temperature often varies rapidly for a certain time after the optical disk driving apparatus is power on, the present embodiment can quickly deal with the temperature variation during start-up.

When the spherical aberration learning block BB1 is carried out in a start-up block B22, optimization of a focal position and a track position, gain adjustment, and the like are desirably also performed to initialize reproduction conditions.

Figure 10:
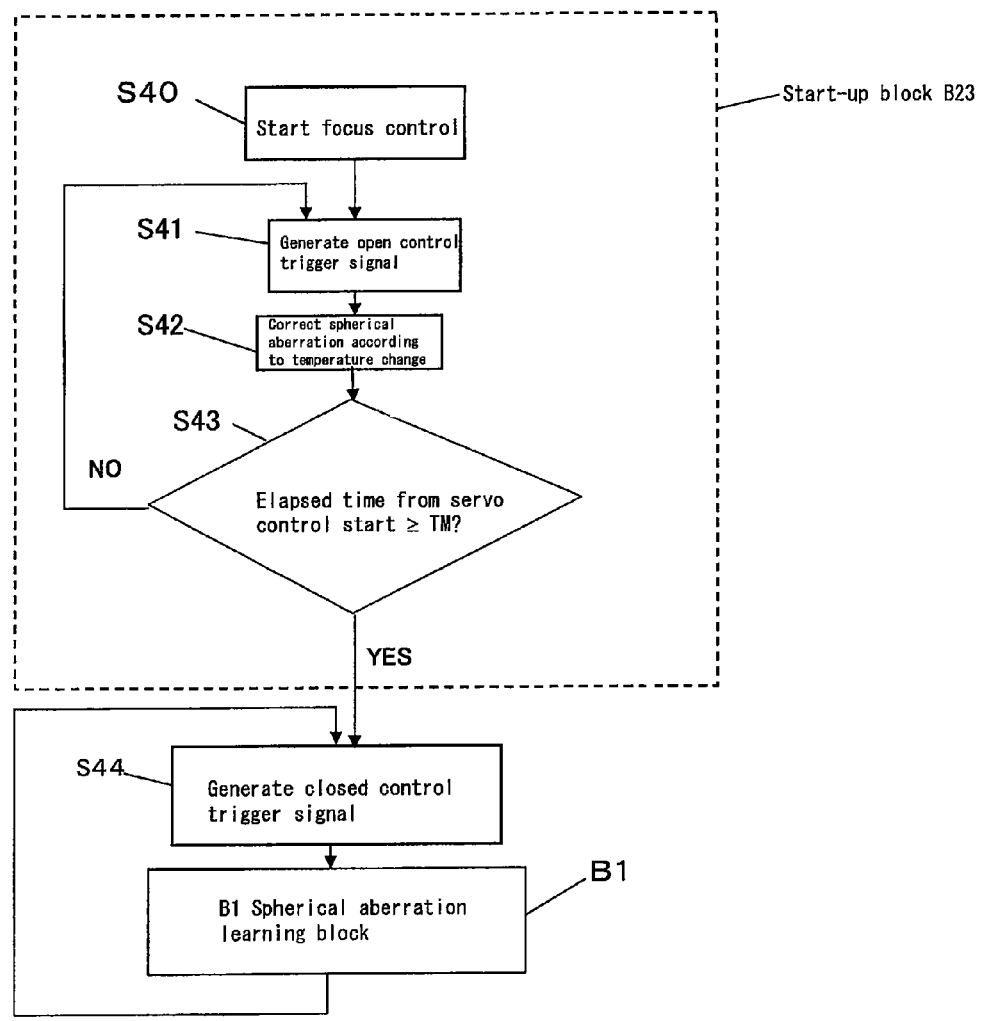
FIG. 10 is a flowchart showing a variation of the method of spherical aberration learning according to Embodiment 5.

The case in which the spherical aberration learning block BB1 is carried out in the start-up block B22 in FIG. 9 has been described. However, the present invention is not limited to this aspect. For example, as shown in FIG. 10, the spherical aberration learning block BB1 may be omitted. As shown in FIG. 10, a start-up block B23 corresponding to the open loop control is carried out during a given time after the focus control is started or a given time after the power-on. Thereafter, the spherical aberration learning (steps S44 to B1) corresponding to the closed loop control is performed. Basically the same steps as those in FIG. 9 are denoted by the same step numbers.

However, in step 42 in FIG. 10, when the first open loop control is performed, the first temperature data (Dt1) cannot be acquired owing to the lack of step BB1 unlike in the case of FIG. 9. However, when the open loop control is thereafter repeated, the temperature data (Dt1) which was last acquired in step S42 can be used.

Figure 8:
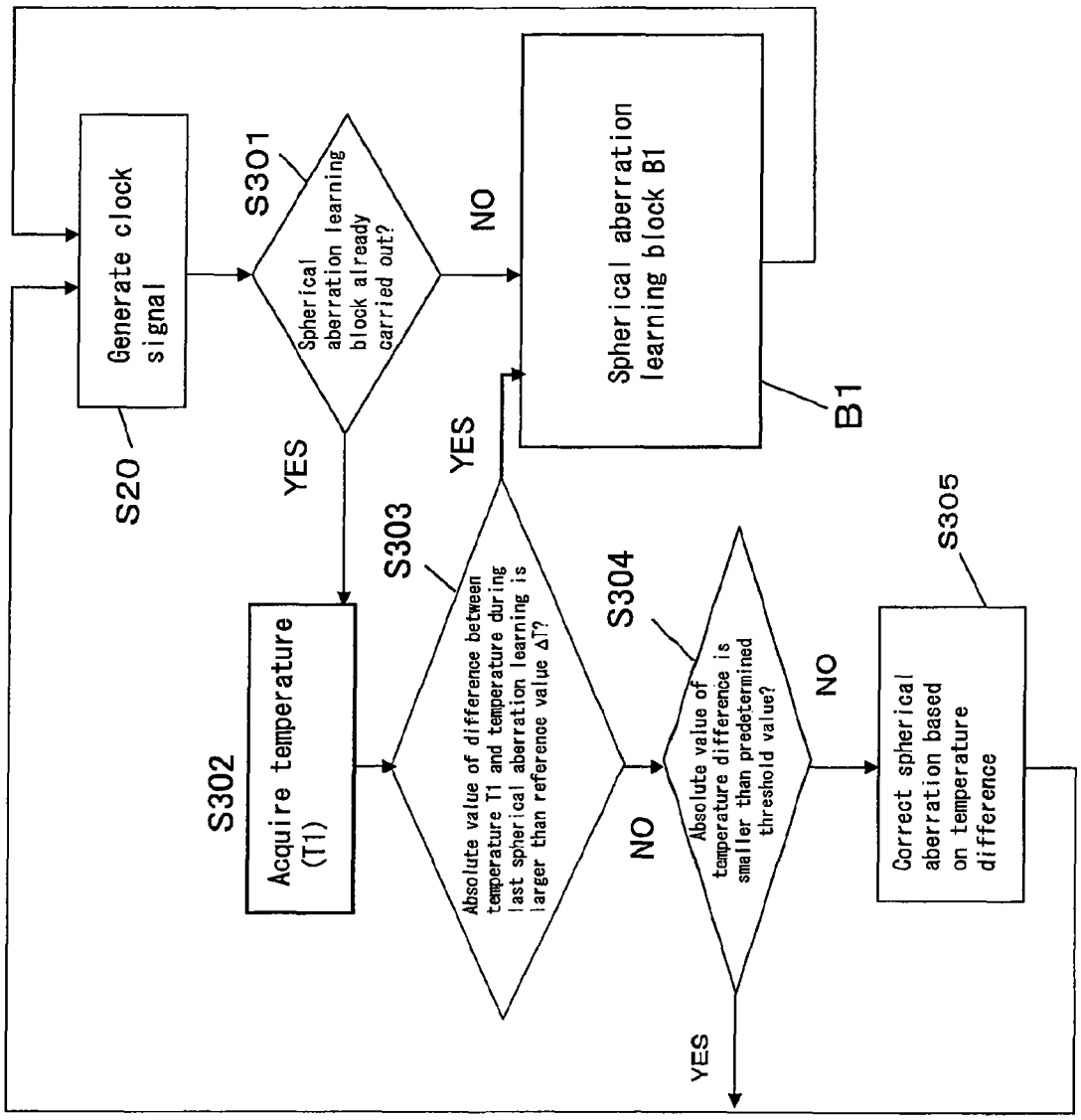
FIG. 8 is a flowchart showing a method of spherical aberration learning according to Embodiment 4.

In the open loop control performed in step S112 in FIG. 7, step S305 in FIG. 8, and step S42 in FIGS. 9 and 10 according to the above-described embodiments, the travel distance M of the collimate lens 8 is calculated utilizing the temperature sensed by the temperature sensor and the value of the current flowing through the actuator. However, the present invention is not limited to this aspect. For example, the travel distance M may be determined according to the temperature change amount of the vicinity of the objective lens 14 utilizing only the temperature sensed by the temperature sensor 17 without the need to take into account the value of the current flowing through the actuator.

Furthermore, in step S112 in FIG. 7, step S305 in FIG. 8, and step S42 in FIGS. 9 and 10 according to the above-described embodiments, the spherical aberration correction is performed according to the temperature change amount (temperature difference). However, the present invention is not limited to this aspect. For example, the spherical aberration may be corrected according to the temperature (not the temperature change amount) sensed by the temperature sensor 17 without the need to take into account the value of the current flowing through the actuator. In this case, with the relationship between the temperature and the spherical aberration acquired by experiments or the like, the travel distance of the collimate lens 8 in the optical axis direction can be acquired based on the temperature sensed by the temperature sensor 17.

Furthermore, if the temperature sensor is used, the temperature sensor may be placed in the vicinity of the laser light source or the objective lens or at a plurality of positions.

Additionally, in the above-described embodiments, in step S111 in FIG. 7 and step S44 in FIGS. 9 and 10, the closed control trigger signal is issued at preset time intervals as a trigger allowing the closed loop control to be started. However, the present invention is not limited to this aspect. The closed control trigger signal may be issued, for example, when at least any one of the following events occurs: (1) the index for the quality of the reproduction signal indicates that the quality is degraded compared to a predetermined standard, (2) the temperature of the optical head device, particularly of the vicinity of the objective lens, changes by at least the given value, and (3) the travel distance of the optical head device in the radial direction changes by at least the given value.

Furthermore, in the above-described embodiments, the temperature change amount (temperature difference) is used as a trigger allowing the start of the spherical aberration learning block B1 (step B1) in FIG. 8, corresponding to the closed loop control. However, the present invention is not limited to this aspect. Step B1, corresponding to the closed loop control, may be started, for example, when at least any one of the following events occurs: (1) a predetermined time elapses, (2) the index for the quality of the reproduction signal indicates that the quality is degraded compared to the predetermined reference value, and (3) the travel distance of the optical head device in the radial direction changes by at least the given value.

Additionally, in the above-described embodiments, in step S110 in FIG. 7 and step S41 in FIGS. 9 and 10, the open control trigger signal is issued at intervals of the preset period as a trigger allowing the open loop control to be started. However, the present invention is not limited to this aspect. The open control trigger signal may be issued, for example, when at least any of the following events occurs: (1) the temperature of the vicinity of the objective lens 14 changes by at least a preset temperature, (2) the index for the quality of the reproduction signal indicates that the quality is degraded compared to a predetermined reference value, and (3) the travel distance of the optical head device in the radial direction changes by at least the given value.

Furthermore, in the configuration in which the closed loop control is combined with the open loop control, any of the four events (1) to (4) described in Embodiment 2 may be combined together as triggers for the respective controls. For example, the "elapse of the predetermined time" in (1) may be used as a trigger for the closed loop control, whereas the "change in temperature" in (3) may be used as a trigger for the open loop control. Alternatively, a plurality of types of triggers may be combined together. For example, for the closed loop control, the "change in temperature" is used as a first trigger and the "elapse of the predetermined time" may be used as a second trigger, and for the open loop control, the "change in temperature" may be used as a trigger. An example of this case has been described above in Embodiment 4 as a variation of the embodiment. That is, in the configuration including the additional function of inevitably carrying out step B1 if the preset time ($\tau$b; $\tau$b>$\tau$t) elapses, the "time $\tau$b" corresponds to the second trigger.

Additionally, in the description of Embodiments 1 to 4 and others, the start-up block is not provided. However, the present invention is not limited to this aspect. For example, the start-up block B22 shown in FIG. 9 or a start-block B23 shown in FIG. 10 may be provided, or step B21 in the start-up block B22 in FIG. 9 may be exclusively provided as a start-up block.

Furthermore, in step S8 in FIGS. 5 and 6 according to the above-described embodiments, the spherical aberration changed in step S4 is returned to the original state. However, the present invention is not limited to this aspect. For example, step S8 may be placed between step S5 and step S6. In this case, only if step S6 determines that the signal quality L2 is improved compared to L1 by at least the specified value $\Delta$L, the collimate lens 8 is moved by the distance corresponding to +SA1. Thus, for example, in step S10, the collimate lens 8 has only to be moved by the distance corresponding to −SA. This enables inhibition of a significant change in spherical aberration in the closed loop control as a whole. Consequently, the reproduction signal quality can further be inhibited from being degraded.

Embodiment 6

An embodiment of an optical disk system according to the present invention will be described.

In the present embodiment, a computer which is an aspect of the optical disk system and which includes the optical disk driving apparatus 167 described in any of the embodiments will be described with reference to FIG. 11.

The optical disk system including the optical disk driving apparatus according to any of the above-described embodiments or employing the above-described recording and reproducing method can properly reproduce information from an optical recording medium with a high recording density by using inexpensive resign objective lens; the optical disk system may be a computer, an optical disk player, or an optical disk recorder. Thus, the optical disk system can be effectively used for various applications.

Figure 11:
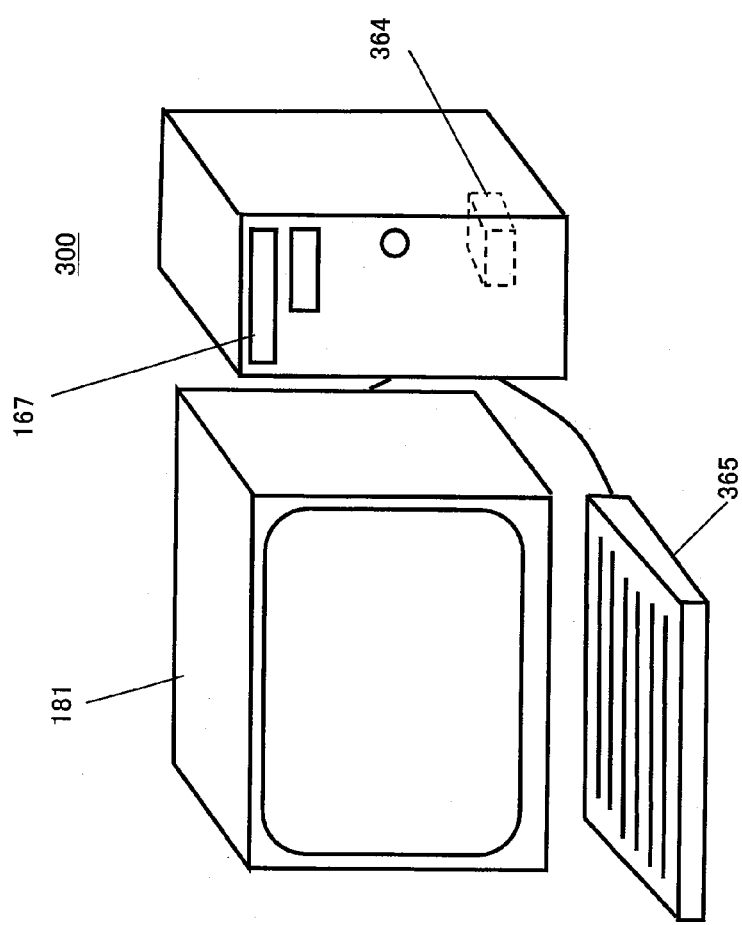
FIG. 11 is a schematic perspective view showing a configuration of a computer according to Embodiment 6 of the present invention.

As shown in FIG. 11, a computer 300 according to the present embodiment includes the optical disk driving apparatus 167 described above in any of the embodiments, an input device 365 such as a keyboard, a mouse, or a touch panel which is used to input information, a calculation device 364 such as a central processing unit (CPU) which performs calculations based on information input via the input device 365 or information read from the optical disk driving apparatus 167, and an output device 181 such as a cathode-ray tube, a liquid crystal display device, or a printer which displays information such as the results of the calculations performed by the calculation device 364.

Embodiment 7

Now, an embodiment of the optical disk system according to the present invention will be described.

In the present embodiment, an optical disk player which is an aspect of the optical disk system and which includes the optical disk driving apparatus described above in any of the embodiments will be described with reference to FIG. 12(A).

The present embodiment provides an optical disk player 321 having the optical disk driving apparatus 167 described above in any of the embodiments and an information-to-image converting device (for example, a decoder 366) that converts an information signal obtained from the optical disk driving apparatus 167 into an image. A display device such as a liquid crystal monitor 320 may be added to the optical disk player 321 as shown in FIG. 12(A). The present configuration can also be utilized as a car navigation system.

Embodiment 8

Now, an embodiment of the optical disk system according to the present invention will be described.

In the present embodiment, an optical disk recorder which is an aspect of the optical disk system and which includes the optical disk driving apparatus described above in any of the embodiments will be described with reference to FIG. 12(B).

An optical disk recorder (video recording device) 110 has the optical disk driving apparatus 167 described above in any of the embodiments and an image-to-information converting device (for example, an encoder 368) that converts image information into information to be recorded on the optical disk by the optical disk driving apparatus 167. Desirably, the optical disk recorder 110 also has the information-to-image converting device (for example, the decoder 366) that converts an information signal obtained from the optical disk driving apparatus 167 into an image, to enable already recorded information to be reproduced. The optical disk recorder 110 may further include an output device 361 such as a cathode-ray tube, a liquid crystal display device, or a printer which displays information.

Embodiment 9

Now, an embodiment of the optical disk system according to the present invention will be described with reference to FIG. 13.

The optical disk driving apparatus 167 used in the present embodiment is described above in any of the embodiments.

Figure 13:
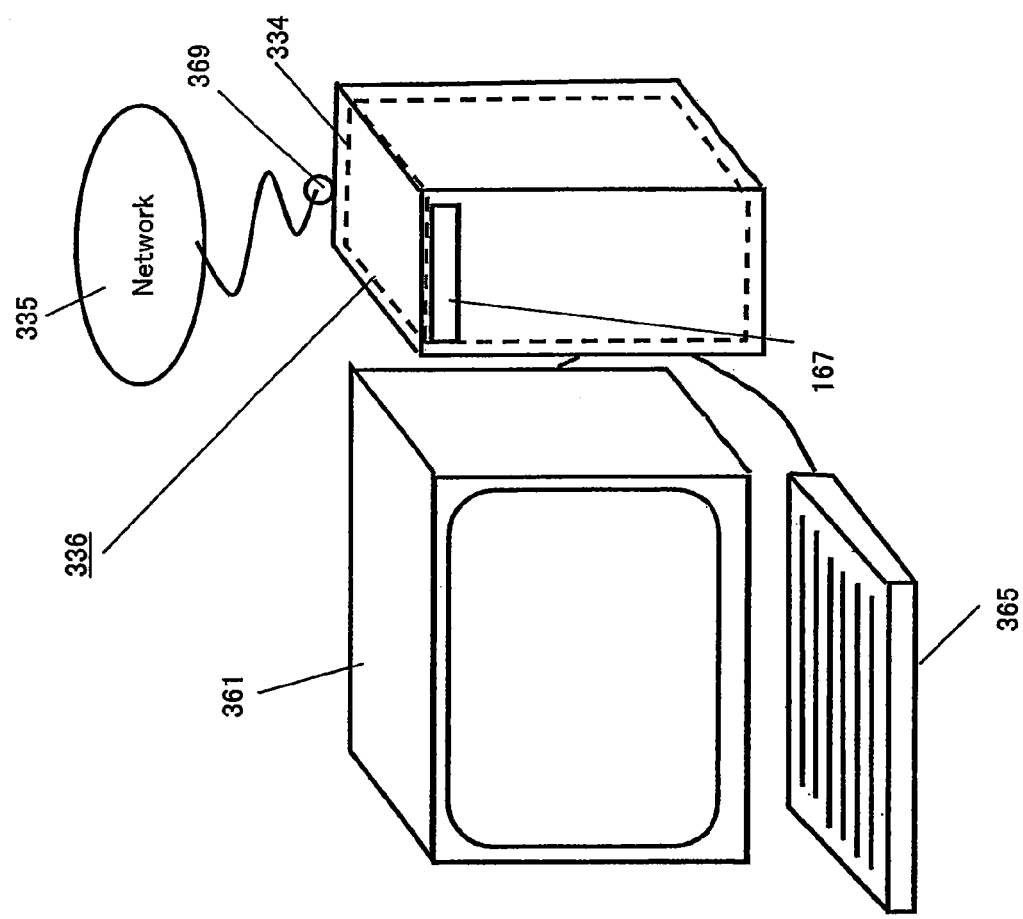
FIG. 13 is a schematic perspective view showing a configuration of an optical disk server according to Embodiment 9 of the present invention.

An optical disk server 336 shown in FIG. 13 has the optical disk driving apparatus 167, an input/output terminal 369 through which information to be recorded is loaded into the optical disk driving apparatus 167, and a wired or wireless input/output terminal 369 through which information read by the optical disk driving apparatus 167 is output to an external device. The optical disk server 336 can be connected to a network 335. Thus, the optical disk server 336 can transmit and receive information to and from a plurality of pieces of equipment on the network 335, for example, a computer, a telephone, and a television tuner. The optical disk server 336 can thus be utilized as a shared information server (optical disk server) as viewed from the plurality of pieces of equipment.

Thus, the optical disk server 336 enables information to be stably recorded on or reproduced from a high-density optical disk. Consequently, the optical disk server 336 can be effectively used for various applications.

The optical disk server 336 may include the output device 361 such as a cathode-ray tube, a liquid crystal display device, or a printer which displays information.

The optical disk server 336 may further include a changer 334 that allows a plurality of optical disks to be placed in and removed from the optical disk driving apparatus 167. This is effective for accumulatively storing a large amount of information.

Embodiment 10

Now, an embodiment of a vehicle according to the present invention will be described with reference to FIG. 14.

The optical disk driving apparatus 167 used in the present embodiment is described above in any of the embodiments.

Figure 14:
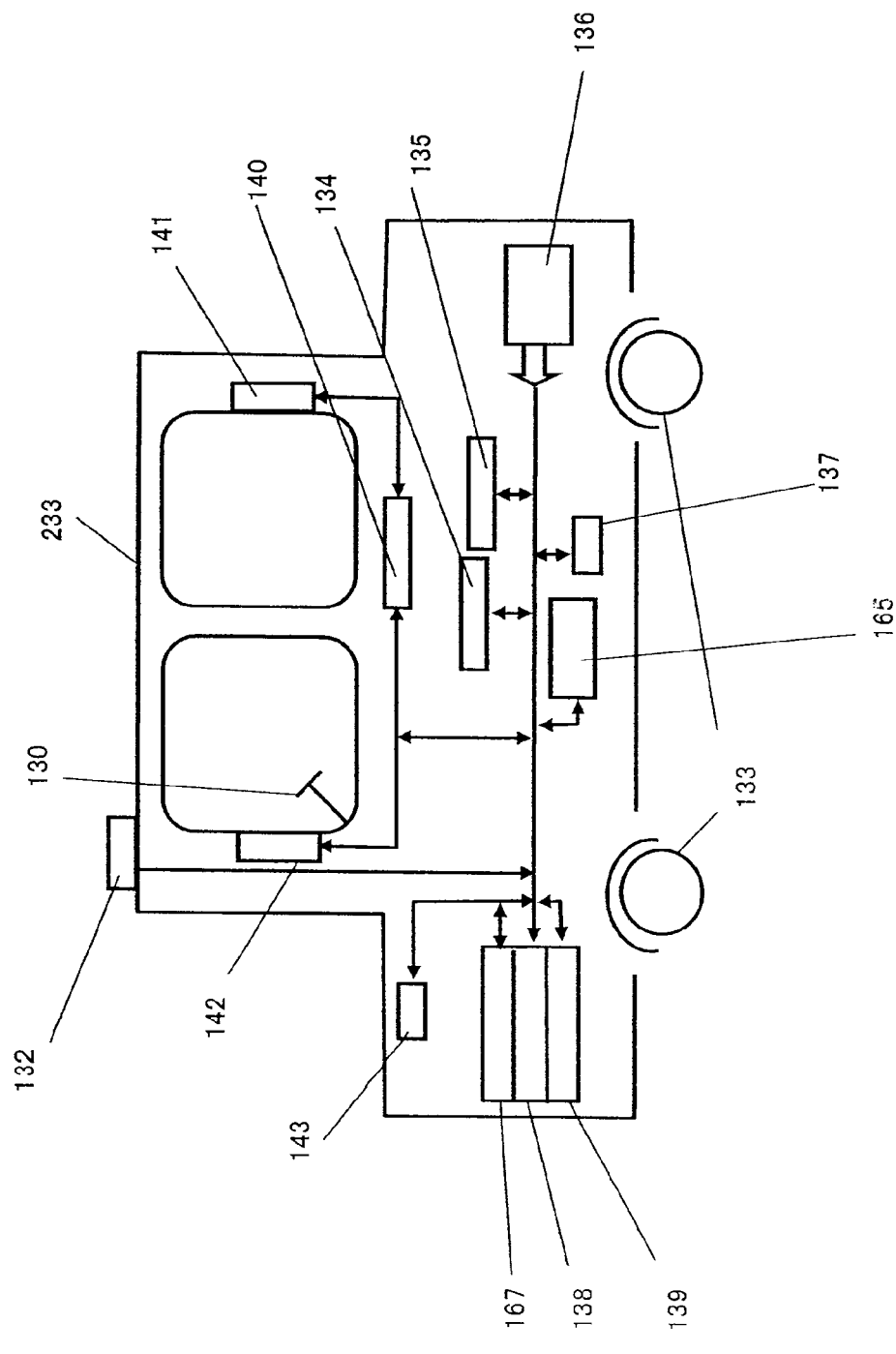
FIG. 14 is a schematic diagram showing a configuration of a vehicle according to Embodiment 10 of the present invention.
Figure 15:
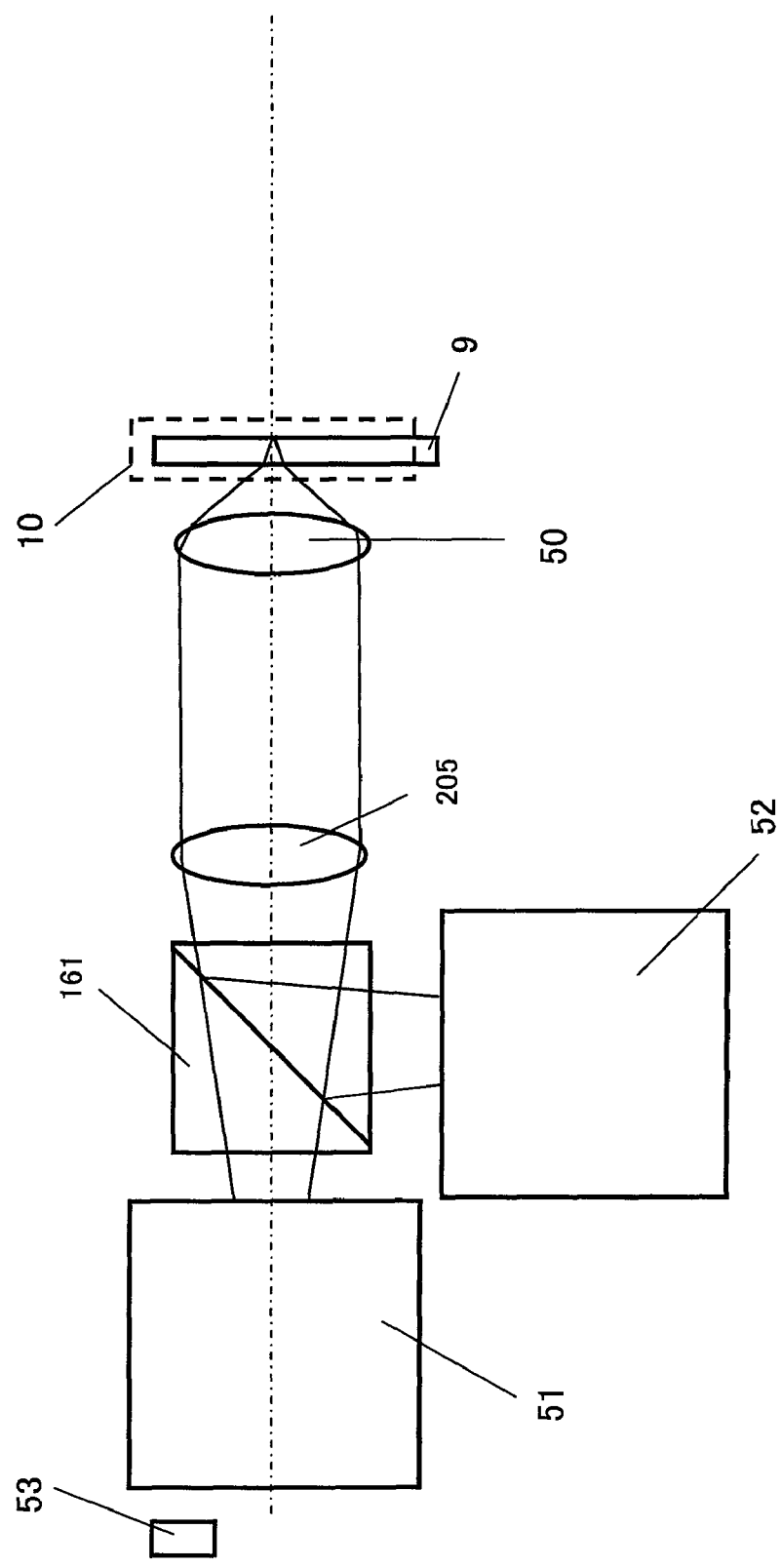
FIG. 15 is a diagram illustrating an optical pickup according to a conventional example.

As shown in FIG. 14, reference numeral 233 denotes a body in which the optical disk driving apparatus 167 is mounted. Reference numeral 134 denotes a power generating section that generates power required to move the body 233. The vehicle further includes a fuel storage section 135 in which a fuel to be supplied to the power generating section 134 is stored, and a power source 136.

The optical disk driving apparatus 167 according to the present invention thus mounted in the body 233 allows a user in the vehicle shown in FIG. 14 to stably obtain or record information from or on various types of optical disks. If the vehicle is a train or a car, the vehicle further includes wheels 133 for traveling. Furthermore, if the vehicle is a car, the vehicle includes a steering wheel 130 for a direction change.

Moreover, providing the vehicle with a changer 138 or an optical disk housing section 139 allows a large number of optical disks to be handily utilized. The vehicle may further include a calculation device 165 that processes information obtained from the optical disk into an image, a semiconductor memory 137 that temporarily stores information, and a display device 142. This enables video information to be reproduced from the optical disk. Furthermore, the vehicle may include an amplifier 140 and a speaker 141 to enable voices and music to be reproduced from the optical disk. Then, the user can determine the current location and traveling direction based on images displayed on the display device 142 and voices from the speaker 141, in addition to geographical information reproduced from the optical disk based on a position sensor such as a GPS 132 provided in the vehicle. The vehicle may further include a radio communication section 143 to allow external information to be obtained and utilized complementarily with information from the optical disk.

FIGS. 11 to 14 for Embodiments 6 to 10, described above, show the output devices 181 and 361, the liquid crystal monitor 320, and the display device 142. However, of course, another product form is possible in which the system includes an output terminal and in which the output device 361 and the liquid crystal monitor 320 are omitted from the system and are separately sold.

Figure 12A:
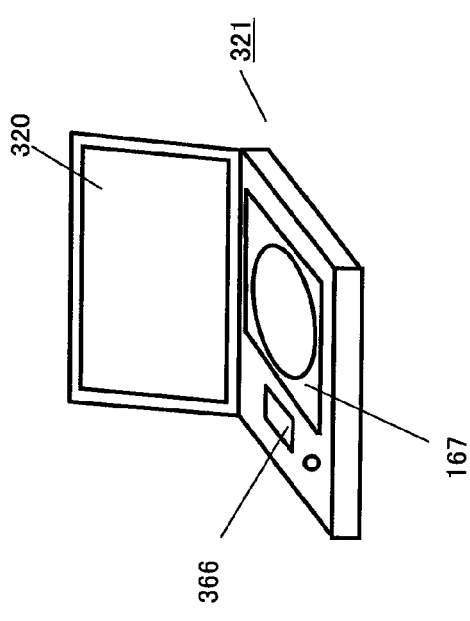
FIG. 12(A) is a schematic perspective view showing a configuration of an optical disk player according to Embodiment 7 of the present invention.
Figure 12B:
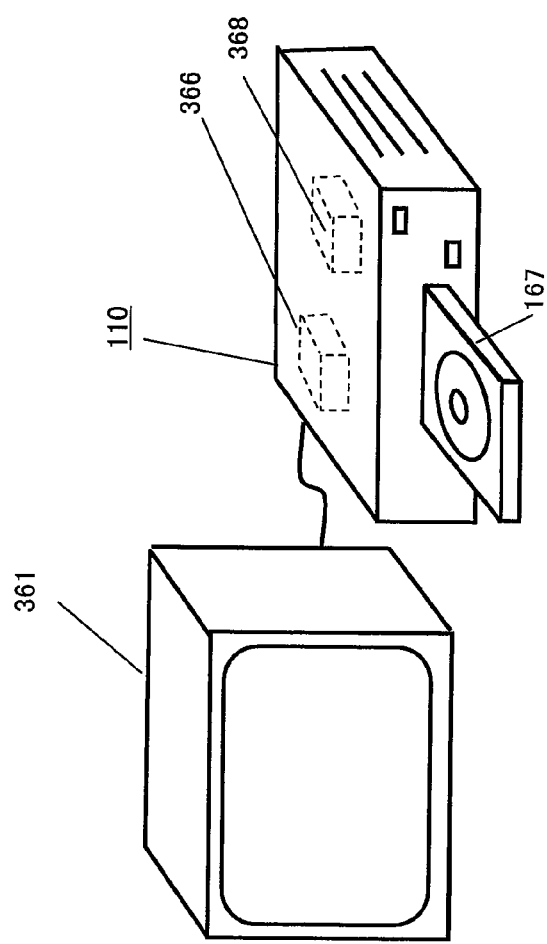
FIG. 12(B) is a schematic perspective view showing a configuration of an optical disk recorder according to Embodiment 8 of the present invention.

Furthermore, FIGS. 12(A), 12(B), and 14 do not show any input device, but another product form is possible in which the system includes an input device such as a keyboard, a touch panel, a mouse, or a remote control device. In contrast, in Embodiments 6 to 10, described above, another form is possible in which the input device is separately sold and in which the system instead includes only an input terminal.

The present invention also provides a program allowing a computer contained in a control circuit (for example, the electric circuit 153) to execute the functions of the whole or a part of the means (or devices, elements, or the like) of the above-described optical disk driving apparatus according to the present invention. The program cooperates with the computer.

The present invention also provides a program allowing the computer contained in the control circuit (for example, the electric circuit 153) to execute the operations in the whole or a part of the steps (or processes, operations, effects, or the like) of the above-described optical disk driving apparatus according to the present invention. The program cooperates with the computer.

The present invention also provides a recording medium in which the program is recorded which allows the computer contained in the control circuit (for example, the electric circuit 153) to execute the functions of the whole or a part of the means (or devices, elements, or the like) of the above-described optical disk driving apparatus according to the present invention. The program that can be read by the computer and that is read from the recording medium cooperates with the computer in executing the functions.

Furthermore, the phrase "a part of the means (or devices, elements, or the like)" as used herein means one or more of the plurality of means. The phrase "a part of the steps (or processes, operations, effects, or the like)" as used herein means one or more of the plurality of steps.

Additionally, a utilization aspect of the program according to the present invention may be such that the program is recorded in a recording medium such as a ROM from which information can be read by the computer and cooperates with the computer.

Furthermore, a utilization aspect of the program according to the present invention is such that the program is transmitted through a transmission medium such as the Internet and a transmission medium such as light, a radio wave, or a sound wave and read by the computer and then cooperates with the computer.

Additionally, the above-described computer according to the present invention is not limited to pure hardware such as a CPU but may include firmware, an OS, and peripheral equipment.

As described above, the configuration according to the present invention may be implemented as software or hardware.

The optical disk driving apparatus, optical disk system, and the like according to the present invention are effective for enabling proper information signals to be reproduced in spite of the use of the objective lens mainly composed of resin. Therefore, the optical disk driving apparatus, optical disk system, and the like according to the present invention can be applied to and expanded into any systems storing information, such as a computer, an optical disk player, an optical disk recorder, a car navigation system, an edition system, a data server, an AV component, and a vehicle.

What is claimed is:

1. An optical disk driving apparatus comprising:
   an optical head device having a laser light source, a converging optical system converging a light beam emitted by the laser light source onto an optical disk, a photo detector receiving reflected light reflected by the optical disk, and an aberration correcting optical system controlling aberration of the converging optical system;
   a motor rotating the optical disk; and
   a control section receiving a signal from the photo detector,
   wherein the converging optical system has an objective lens formed using resin as a main material,
   the aberration correcting optical system has a spherical aberration correcting element correcting spherical aberration of the objective lens,
   the control section evaluates a quality of a reproduction signal for information in the optical disk by using the reflected light received by the photo detector, and utilizes a result of the evaluation to control the spherical aberration correcting element, and
   for the resin that is the main material of the objective lens, a change rate of a refractive index with respect to a change in temperature ranges from $-1.5 \times 10E-4$ per degree centigrade to $-0.8 \times 10E-4$ per degree centigrade.

2. The optical disk driving apparatus according to claim 1, wherein the aberration correcting optical system has a driving section driving the spherical aberration correcting element, and
   the control section performs the control by allowing the driving section to move a position of the spherical aberration correcting element.

* * * * *